Sept. 25, 1945.  W. S. CORBIN ET AL  2,385,691
CONTINUOUS WINDING MACHINE
Filed March 12, 1942  14 Sheets-Sheet 9
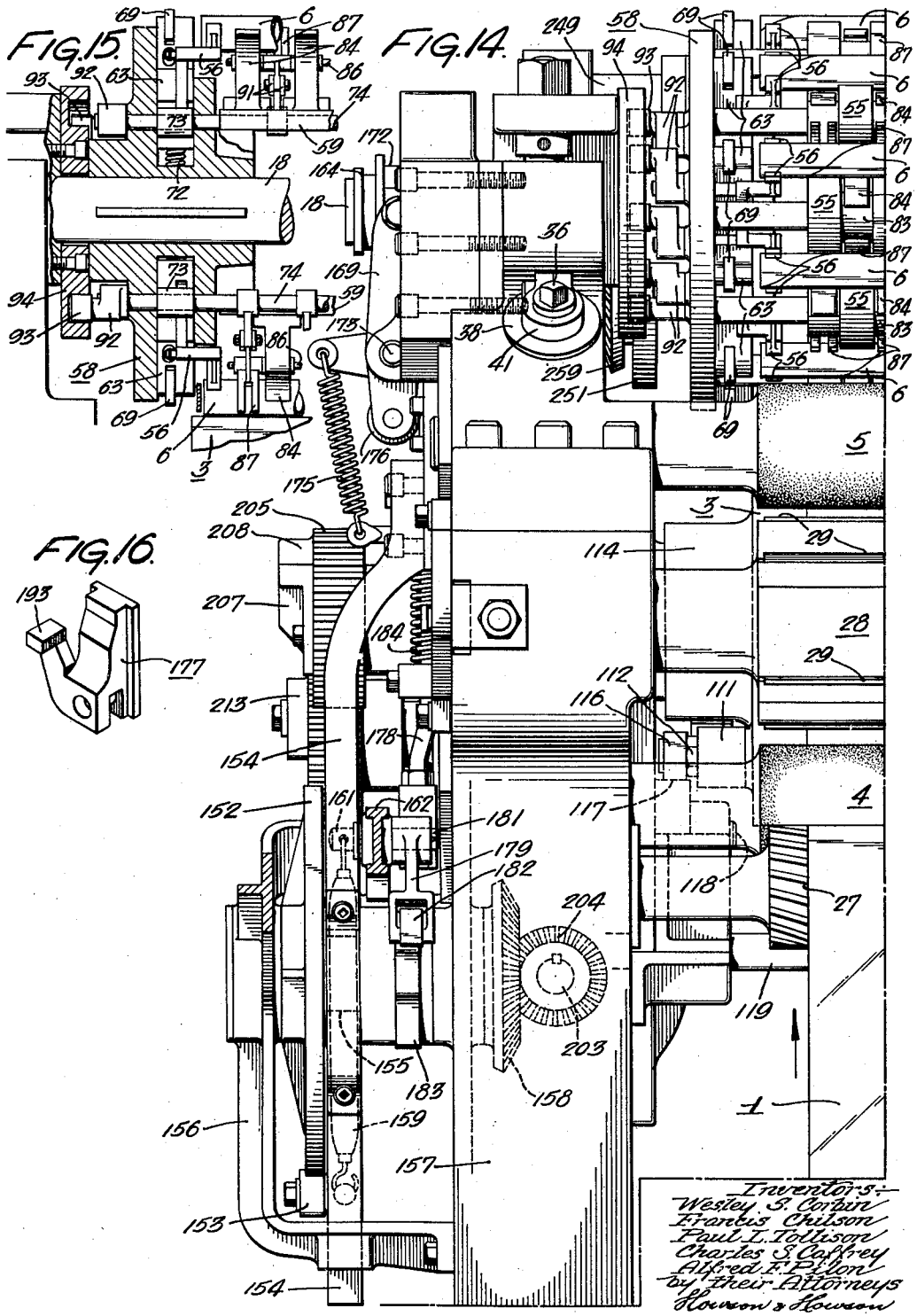
Inventors:
Wesley S. Corbin
Francis Chilson
Paul L. Tollison
Charles S. Caffrey
Alfred F. Pilon
by their Attorneys
Howson & Howson

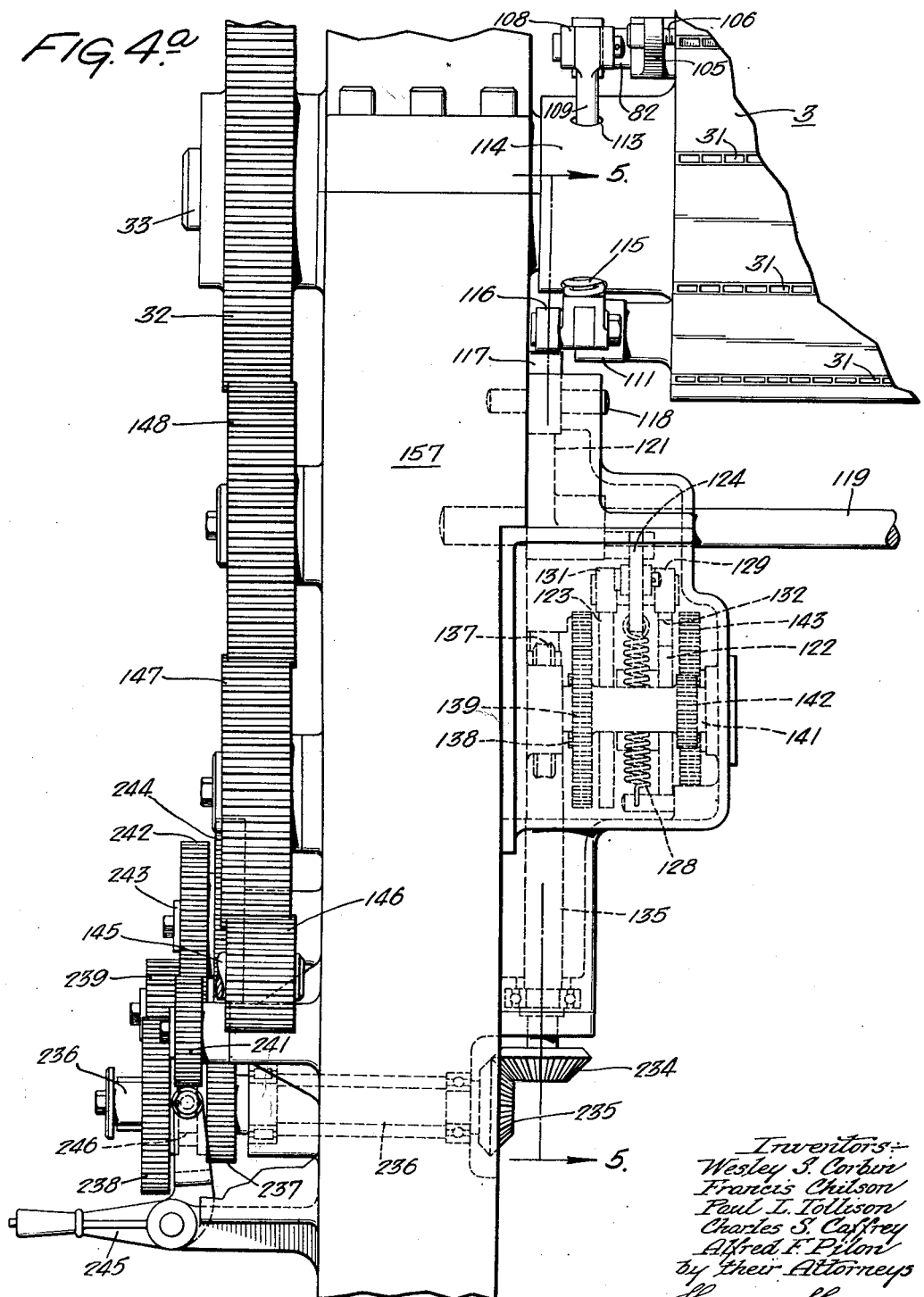

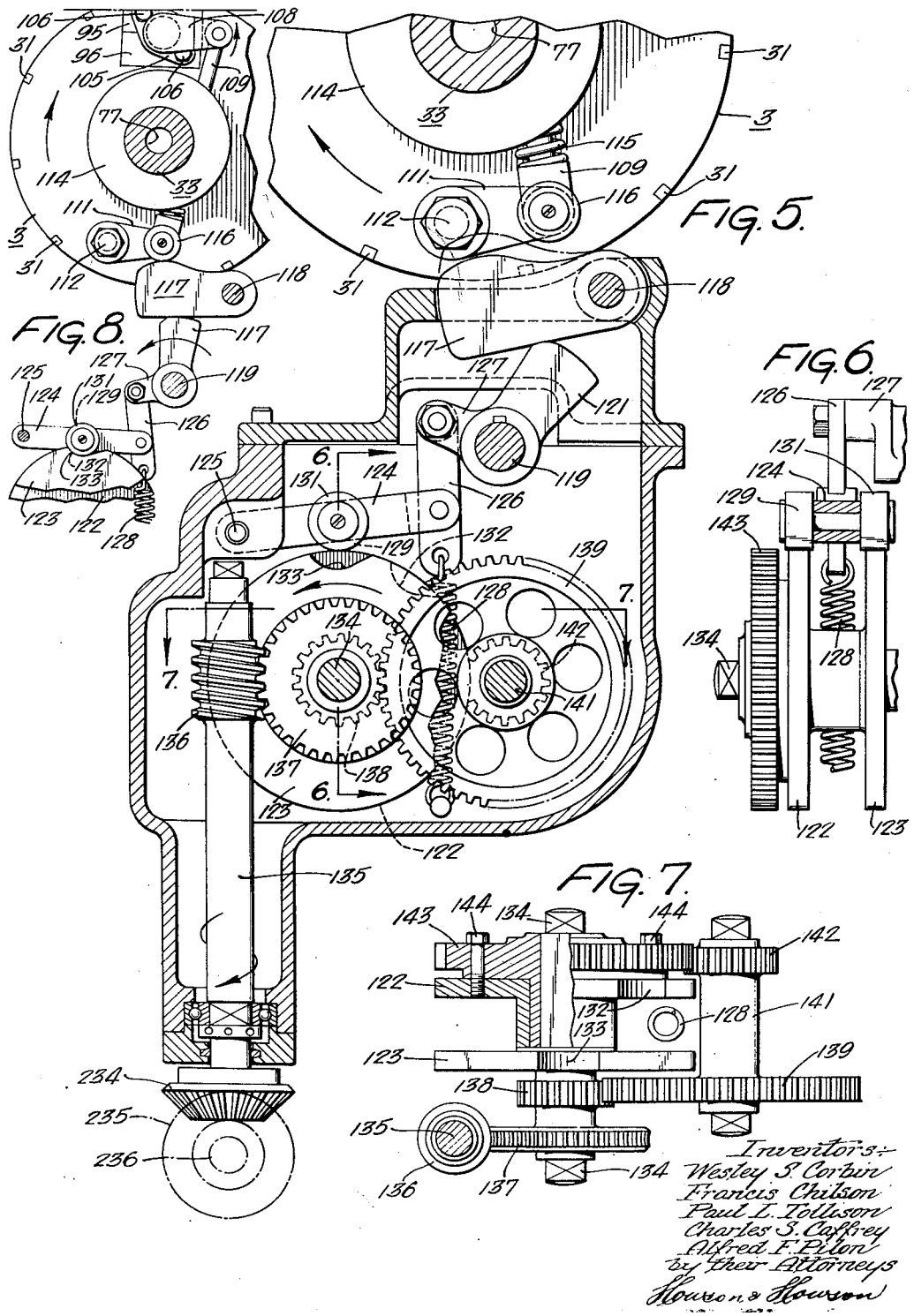

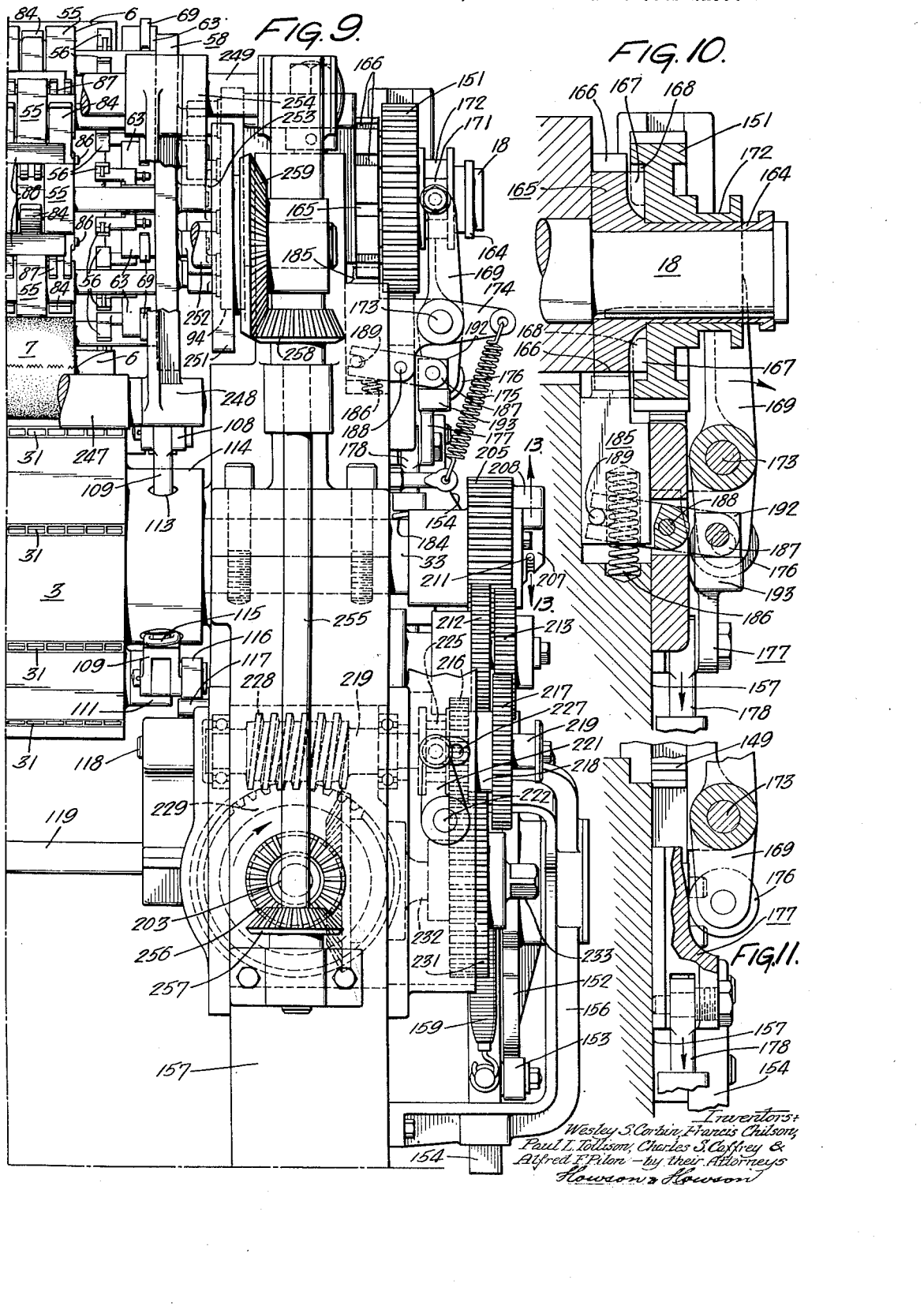

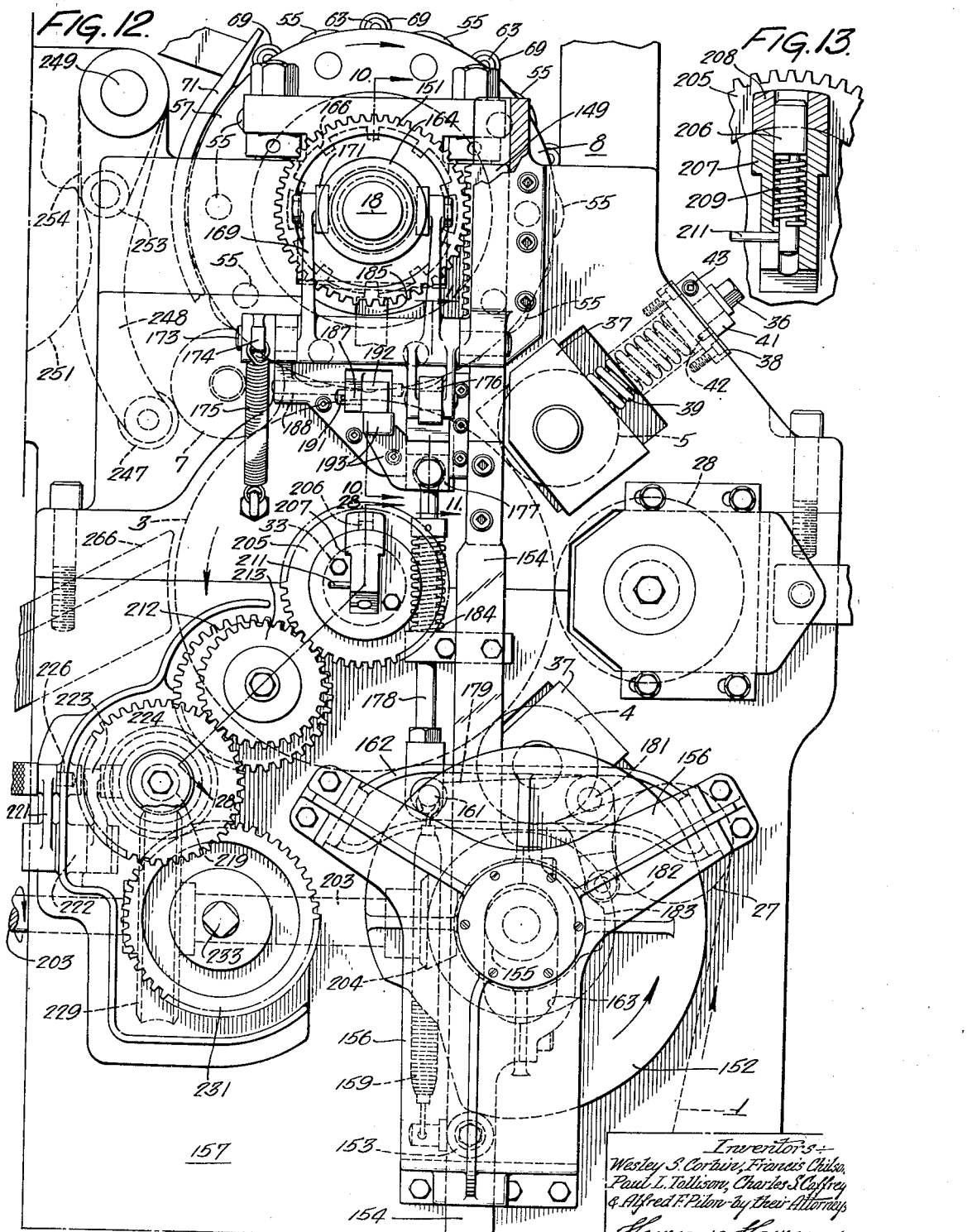

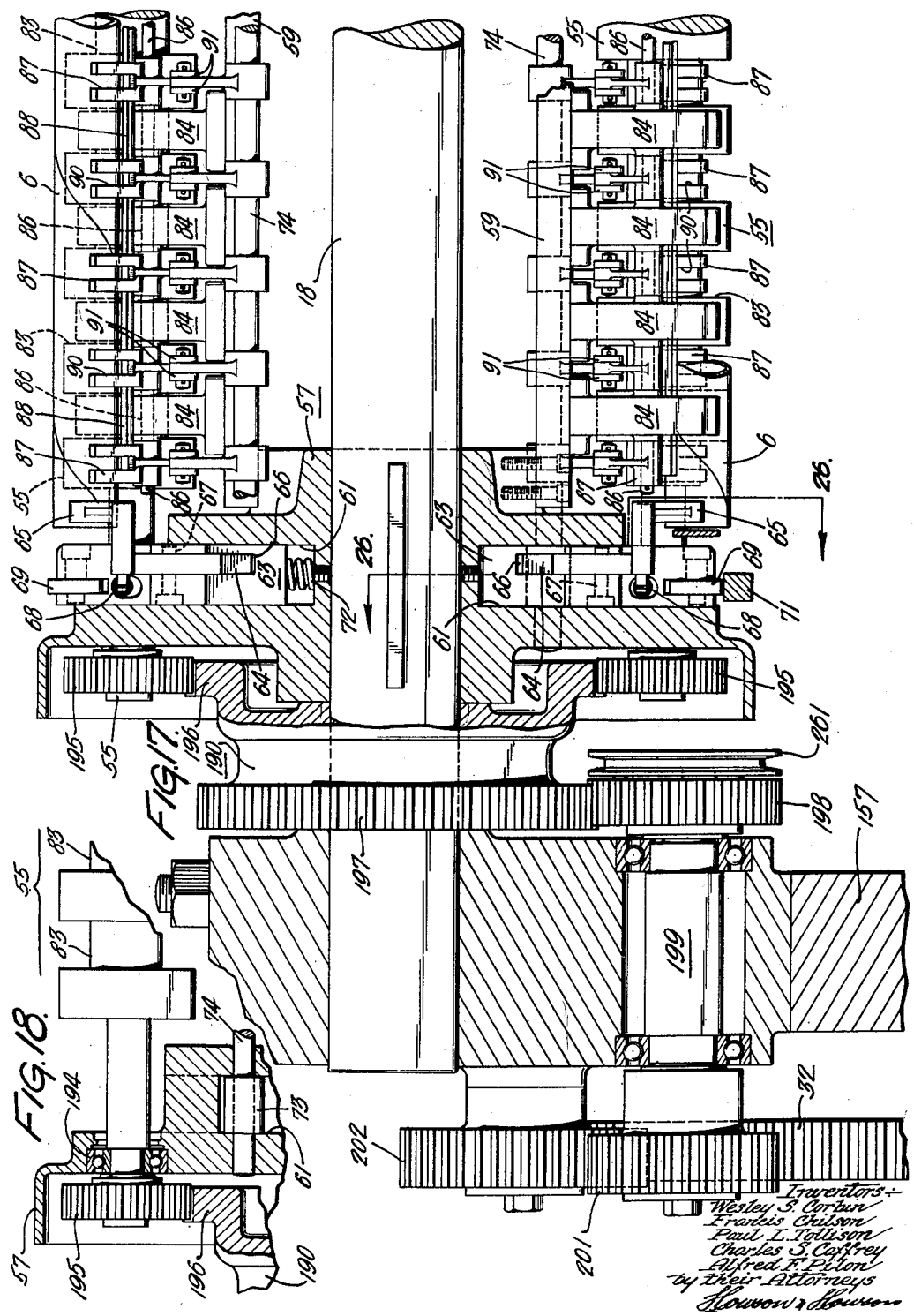

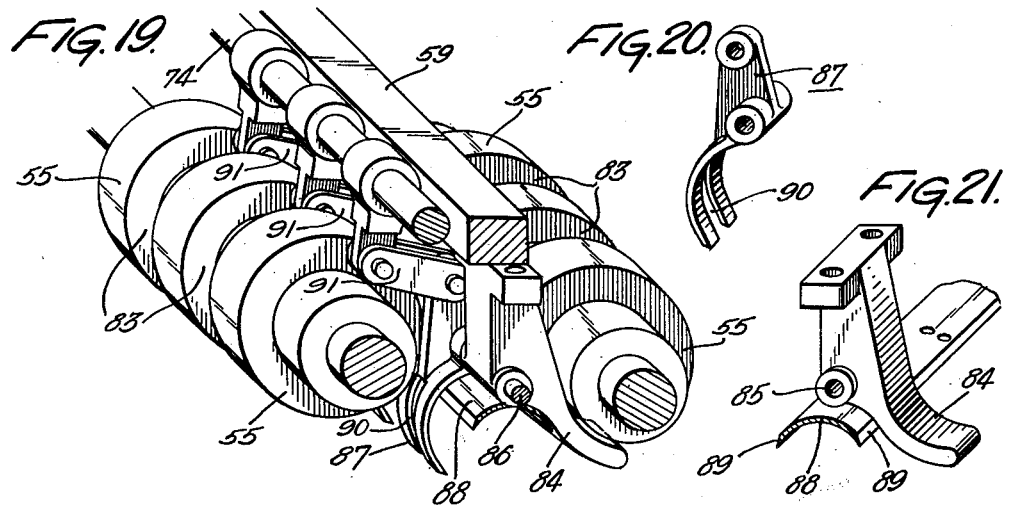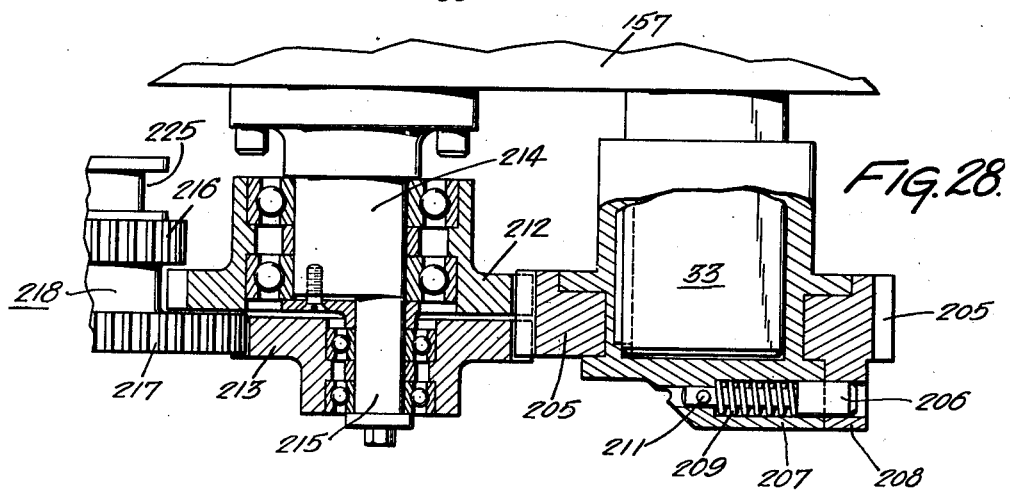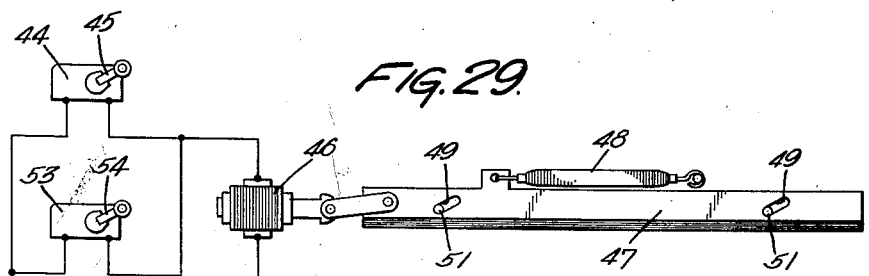

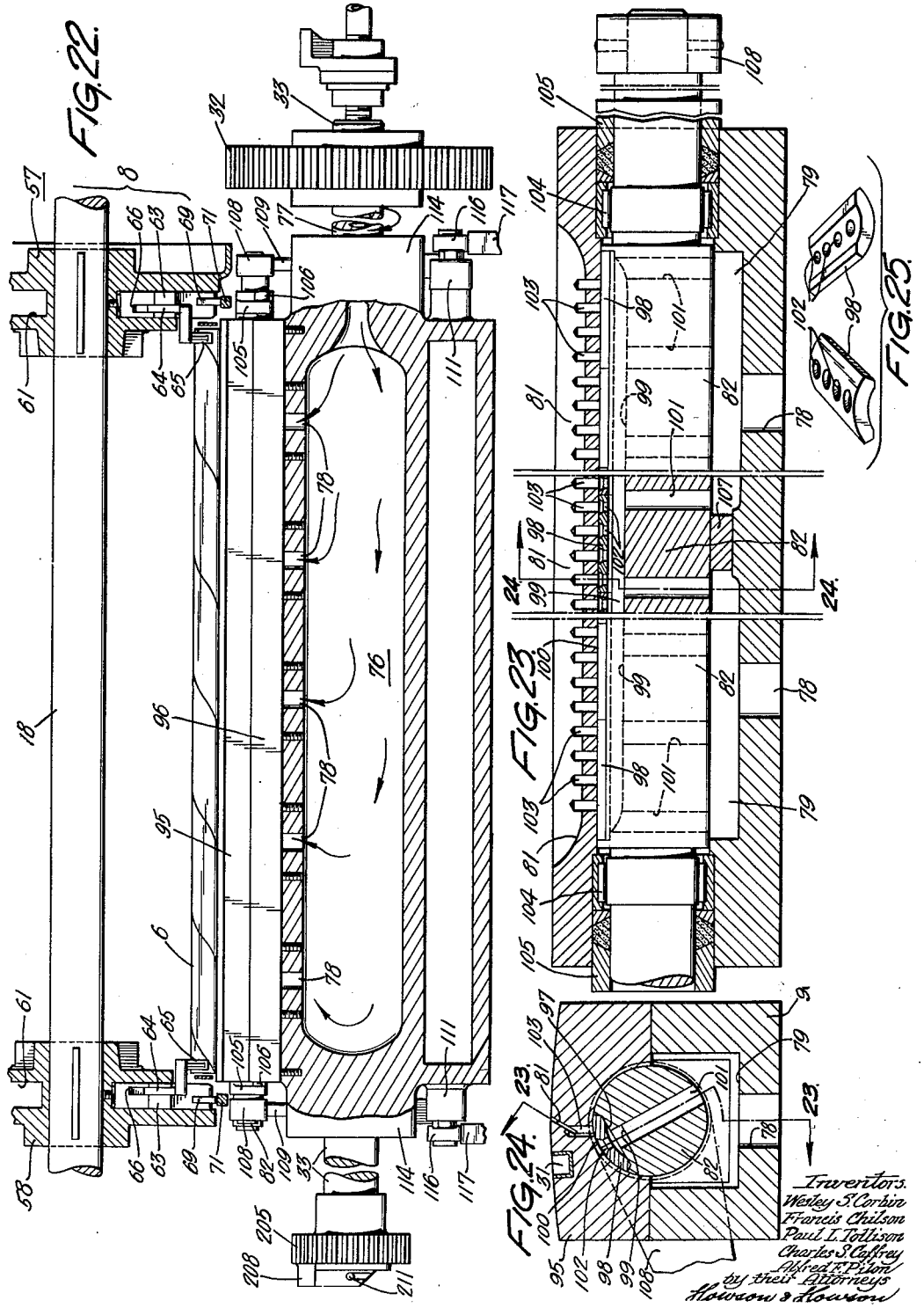

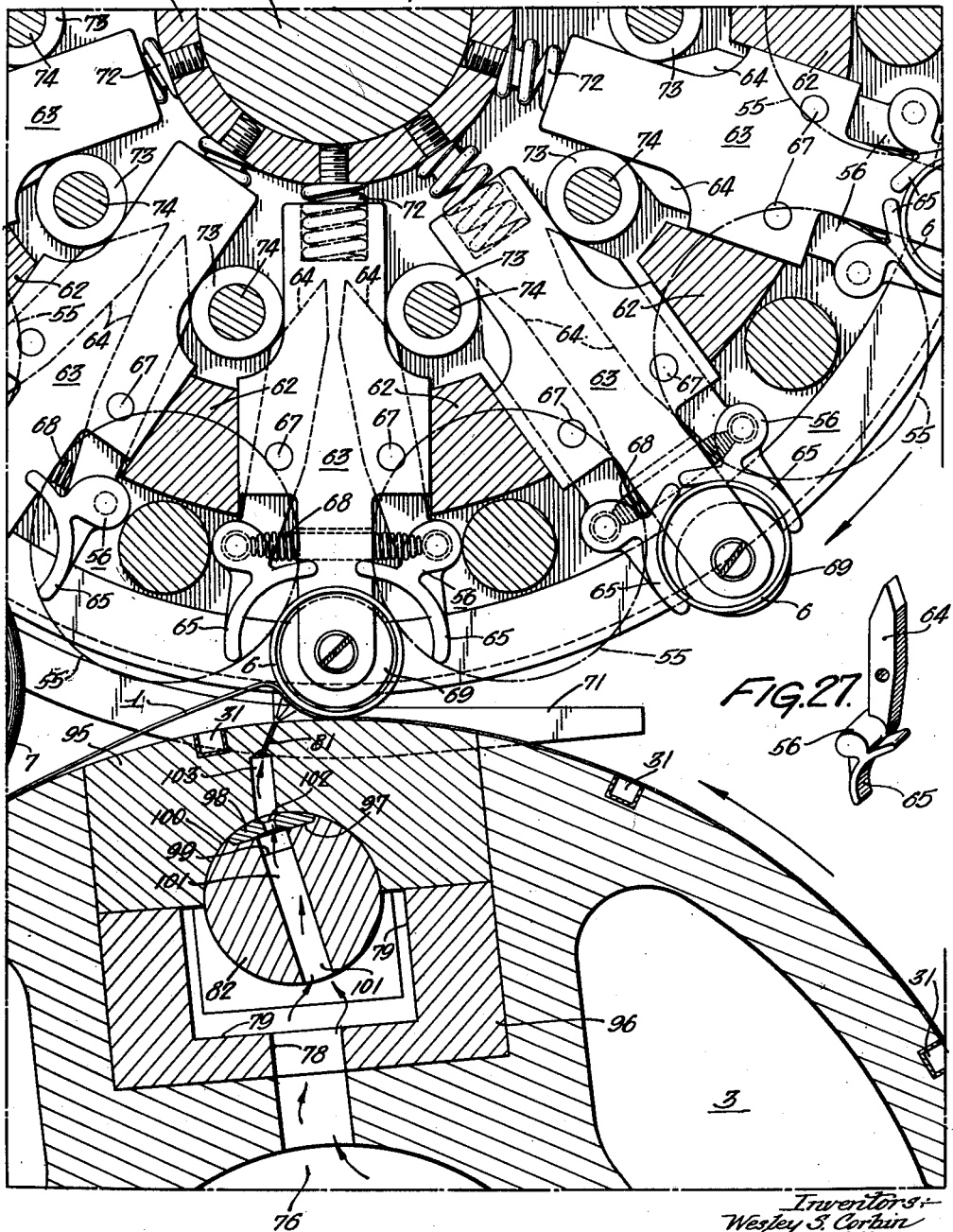

Patented Sept. 25, 1945

2,385,691

UNITED STATES PATENT OFFICE 2,385,691

CONTINUOUS WINDING MACHINE

Wesley S. Corbin, Ridley Park, Pa., Francis Chilson, Scarsdale, N. Y., Paul L. Tollison, North Plainfield, N. J., Charles S. Caffrey, Port Washington, N. Y., and Alfred F. Pilon, North Plainfield, N. J., assignors to Scott Paper Company, Chester, Pa., a corporation of Pennsylvania Application March 12, 1942, Serial No. 434,430

42 Claims. (Cl. 242—56)

This invention relates to paper-winding machines, and more particularly to machines of the type which operate to take paper from a parent roll or rolls and to rewind the paper into rolls of lesser diameter and paper content.

A principal object of the invention is to provide a machine of this type which by reason of certain improved characteristics hereinafter described will operate at a materially increased rate of production.

More specifically, an object of the invention is to provide a machine of the stated type which will operate continuously, and without interruption for the necessary transfer operations, at a constant and materially higher rate of speed than has heretofore been found practicable in machines of this class, particularly in the processing of tissue and similar papers.

The invention provides improved transfer, winding, and control mechanisms all contributing to the desired primary ends of increased production capacity, improved functional efficiency, elimination of waste both in time and product, and the production of high quality rolls of predetermined diametrical size.

In the attached drawings:

Fig. 1a is a diagrammatic side elevational view showing the parent roll driving means;

Figs. 4 and 4a are fragmentary views in front elevation of one side of the machine showing details of the transmission mechanism;

Fig. 5 is a sectional view on the line 5—5, Fig. 4a;

Fig. 6 is a sectional view on the line 6—6, Fig. 5;

Fig. 7 is a sectional view on the line 7—7, Fig. 5;

Fig. 8 is a fragmentary sectional view, but on a reduced scale, corresponding to Fig. 5, and with the latter illustrates a phase of the mechanical operation of the machine;

Fig. 9 is a view in front elevation of the opposite side of the machine from that shown in Fig. 4;

Fig. 10 is a sectional view on the line 10—10, Fig. 12;

Fig. 11 is a sectional view on the line 11—11, Fig. 12;

Fig. 12 is a side elevational view of the part of the machine shown in Fig. 9;

Fig. 13 is a sectional view on the line 13—13, Fig. 9;

Fig. 14 is a view in rear elevation of the same side of the machine shown in Fig. 9;

Fig. 15 is a vertical axial sectional view of that portion of the reel shown in Fig. 14;

Fig. 16 is a view in perspective of one of the elements of reel clutch mechanism;

Fig. 17 is a sectional view on the line 17—17, Fig. 1;

Fig. 18 is a sectional view on the line 18—18, Fig. 1;

Fig. 19 is a fragmentary sectional perspective view showing details of the reel assembly;

Figs. 20 and 21 are views in perspective of elements of the reel assembly;

Fig. 22 is a longitudinal sectional view of the drum;

Fig. 23 is a sectional view on the line 23—23, Fig. 24;

Fig. 24 is a sectional view on the line 24—24, Fig. 23;

Figure 34:
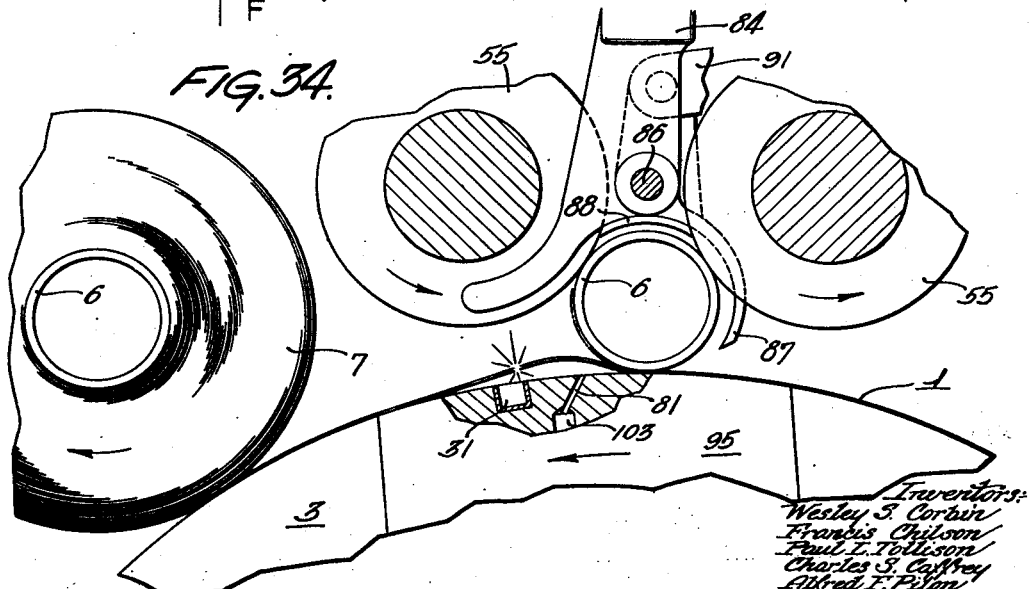

Fig. 25 presents views in perspective of one of the elements of the air valve;

Fig. 26 is a section on the line 26—26, Fig. 17;

Fig. 27 is a view in perspective of one of the core-gripping fingers of the reel;

Fig. 28 is a sectional view on the line 28—28, Fig. 12;

Fig. 29 is a diagrammatic view of one of the safety devices with which the machine is provided;

Figs. 30 to 33, inclusive, are fragmentary sectional and side elevational views illustrating the details and mode of operation of the transfer mechanism, and Fig. 34 is a similar view illustrating a modification of the transfer operation within the scope of the invention.

Figure 1:
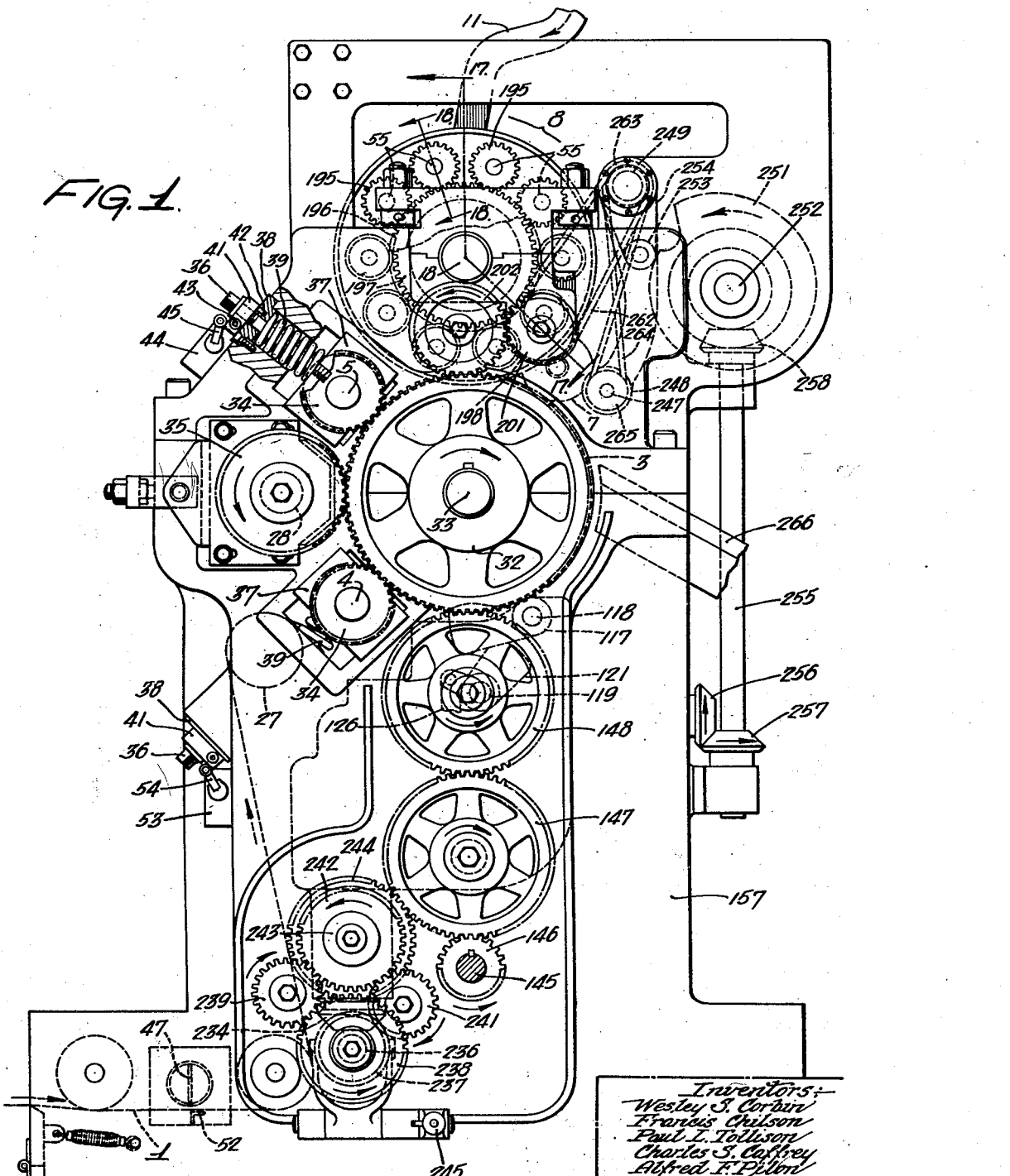
Figure 1 is a side elevational and partial sectional view of a machine made in accordance with the invention.
Figure 2:
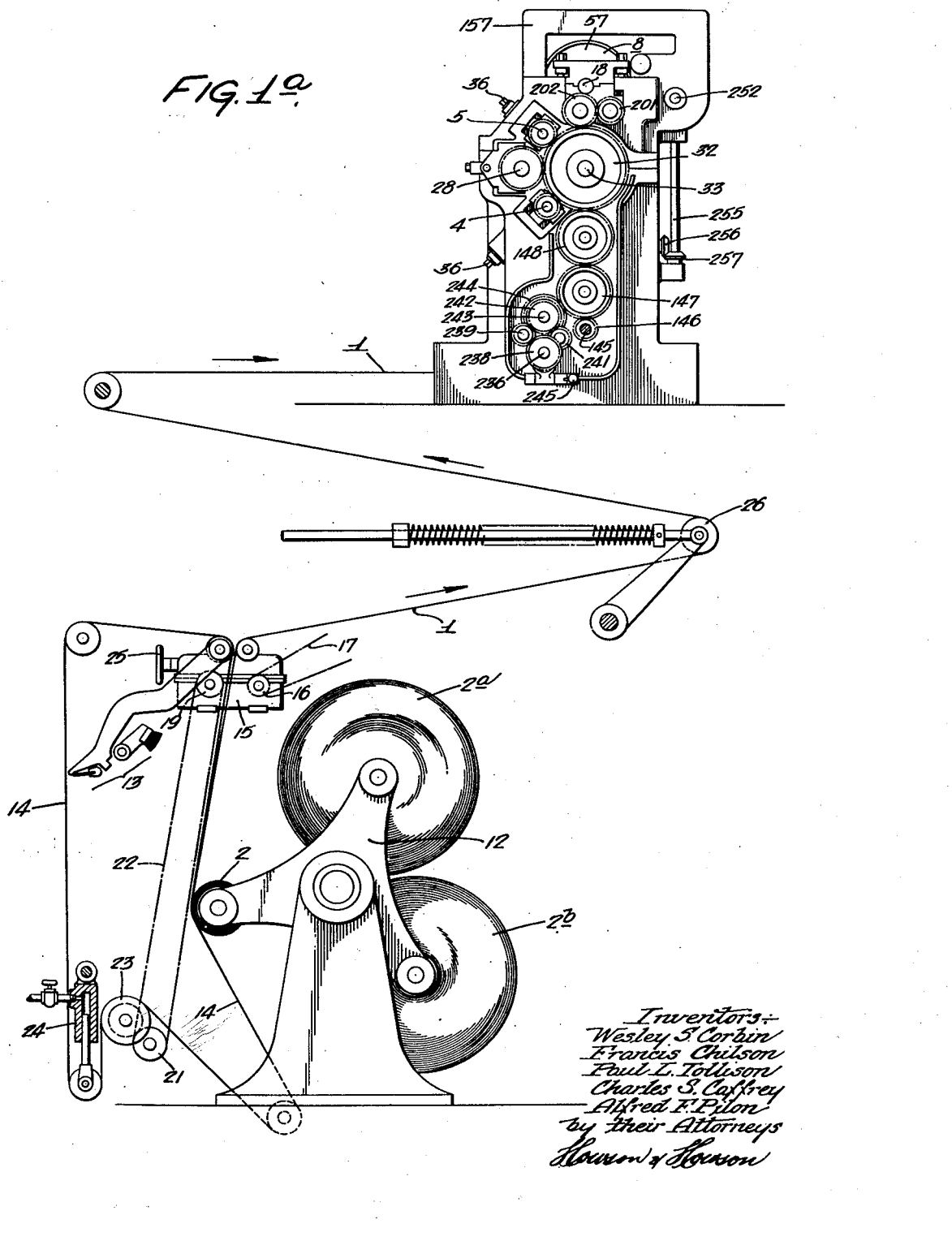
Fig. 2 is a vertical sectional view, in diagram, of the upper portion of the machine.
Figure 3:
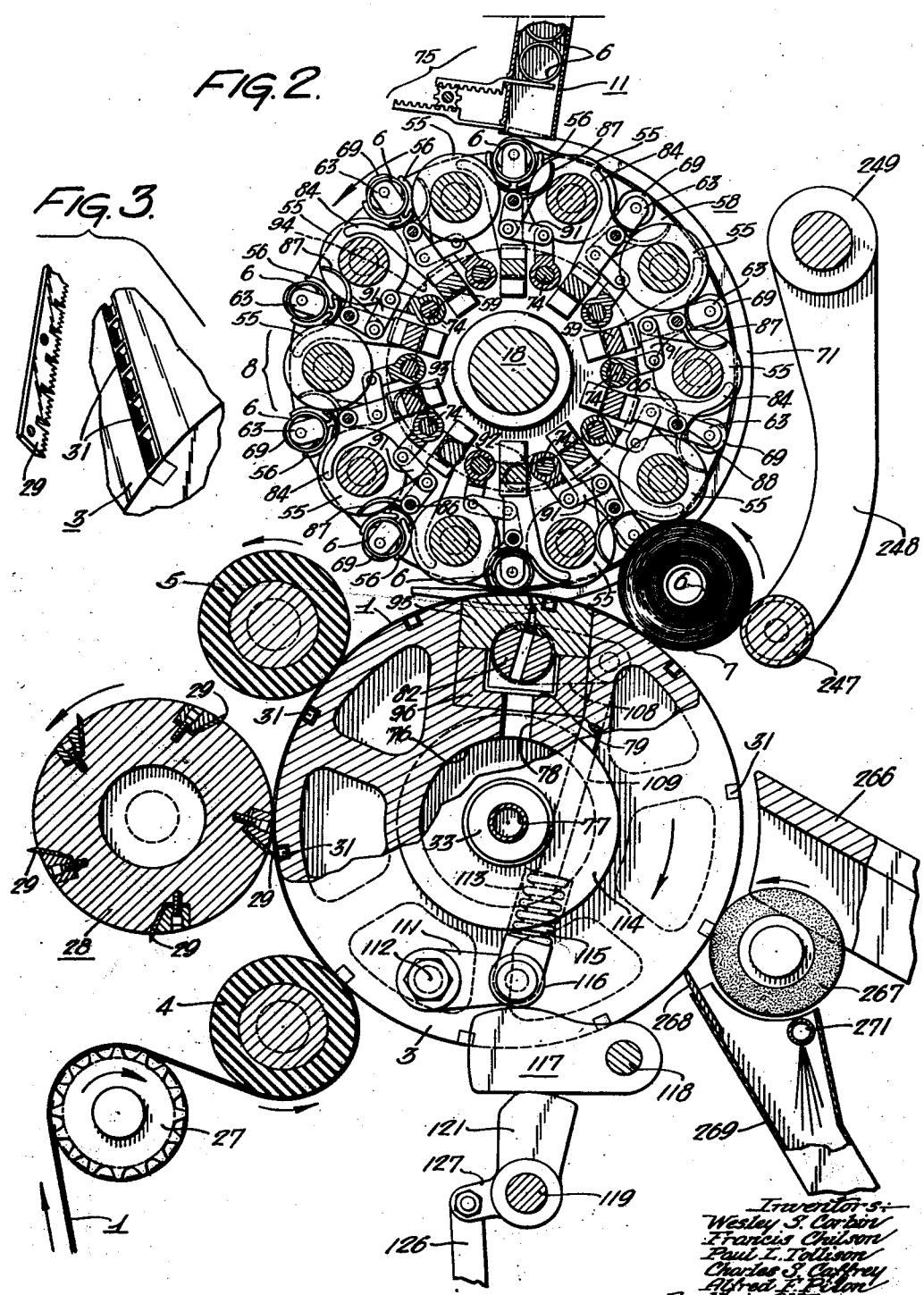
Fig. 3 is a fragmentary view in perspective of elements of the perforating mechanism.

In the operation of the machine, and with reference more particularly to Figs. 1, 1a and 2 of the drawings, a paper web 1, taken from a parent roll 2, passes to a rotary drum 3, and while still in contact with the drum is wound upon a core 6 so as to produce a roll 7, see Fig. 2, of relatively small predetermined diameter and paper content. As the roll 7 is completed, an additional core, advancing on a rotary reel 8, moves into position to receive the web 1, and the web is then transferred to this core for a repetition of the winding operation. The reel 8 receives the additional cores from a hopper 11 and carries them successively to the drum, and the transfer operations are effected without interruption of the movement of the web, so that the operation of the machine is continuous.

The parent roll 2 is mounted, in the present instance, upon a reel 12. This reel also carries two additional rolls 2a and 2b which, as the one roll is exhausted, may be brought successively into position to continue the winding operation; and means, forming no part of the present invention, and including an autopaster 13, is provided for automatically joining the inner terminal end of the one roll to the outer end of the succeeding roll so that the winding operation may be continuous and without interruption. The parent roll is driven during the winding operation through the medium of a belt or belts 14. This belt is driven through a variable speed drive unit 15 of commercial type, the unit preferably being operatively connected through a sprocket 16 and chain 17 directly with the trunnion 33 of the drum 3, or directly with the motor (not shown) which operates the drum. The unit 15 is operatively connected through suitable transmission gearing, including sprockets 19 and 21 and a chain 22, with a drive pulley 23 for the belt 14. The belt 14, as illustrated, bears against the master roll 2 on the reel 12; and means is provided at 24 for tensioning the belt with respect both to the drive pulley 23 and the master roll 2. The ratio of the input and output speeds of the unit 15 is controlled by the movement of a tension roll 26 which engages the web 1 as shown and which is operatively connected with the variable speed unit 15, preferably by hydraulic means not shown and forming no part of the present invention, so as to regulate the speed of the belt 14, and by the effect of this regulation on the parent roll 2 to obtain and to maintain a predetermined tension in the web. With the arrangement shown, the linear speed of the web 1 is not affected by the changing diameter of the parent roll, so that the tension tends to remain constant.

In passing to the drum 3, the web 1 engages a roll 27, this roll having in its surface a spiral fluting or the like extending in opposite directions from the center of the roll and functioning in known manner to smooth the web 1 preparatory to its engagement with the drum 3. Preferably this roll is driven in the direction of the web, as indicated by the arrow in Fig. 2, and at a peripheral speed slightly greater than the linear speed of the web.

From the roll 27, the web passes around a rubber or other soft-surfaced roll 4 and between this roll and the drum 3. The web 1 is engaged also by a corresponding roll 5, and between these rolls means is provided for perforating the web along transverse uniformly spaced lines. Perforation is effected in the present instance through the medium of a rotary perforating head 28 having secured in and projecting from the periphery thereof a uniformly spaced series of perforating blades 29. The blades 29 are of a character to perforate the roll without severing the web. The head 28 is rotated in synchronism with the drum 3, and the surface of the latter is provided with a series of uniformly spaced axially extending slots or recesses 31 for reception of the projecting edges of the said blades. Since the tensioned web 1 overlies the slotted recesses 31, the blades 29 in entering the recesses perforate the web in well known manner.

It is to be noted by reference to Fig. 1 that the rolls 4 and 5 and the head 28 each receives its rotary movement from a gear wheel 32 carried by the trunnion 33 of the drum 3. Attached to an end of each of the rolls 4 and 5 is a gear 34 which meshes with the gear 32 as shown, and the head 28 carries at one end a gear 35 which similarly meshes with the gear 32. The peripheral speed of the head 28 is the same as the speed of the drum 3, but the peripheral speed of the roll 4 is preferably somewhat slower than the peripheral speed of the drum 3 so as to afford a slight dragging action on the web as it passes to the perforating position and to thereby offset the tendency of the blades 29, which by reason of their projection beyond the surface of the head 28 will have a linear speed somewhat greater than the linear speed of the web, to drag the web forward into the recesses 31 in the drum. Preferably the roll 4 is located as close as possible to the head 28 so as to reduce to a minimum the length of web extending between the bite of the roll 4 and the point of perforation. Correspondingly the surface speed of the roll 5 is somewhat greater than the peripheral speed of the drum, so that this roll tends to draw the paper web firmly across the slot during the perforating operation.

The rolls 4 and 5 are not tight against the paper, and will not, in spite of the fact that their surface speeds differ from the surface speed of the drum, affect the speed of the web with the drum speed. As shown in Fig. 1, the position of the rolls 4 and 5 with respect to the surface of the drum 3 may be regulated by means of an adjusting screw 36, one of these screws being threaded into each of the journals 37 of the rolls, and the journals being slidably mounted in the frame. The screw 36 passes freely through an element 38 which is secured to the frame and forms a seat for a spring 39, said spring exerting pressure on the adjustable journal element 37 to resiliently hold the roll in an advanced position. The head of the screw 36 bears against a clamping collar 41 which seats upon the member 38 and is prevented from turning on said member by a pin 42 which extends from the clamp into an aperture in said member. When the clamping collar 41 is tightened, through the medium of a screw 43, upon the bolt, the latter is held rigidly in adjusted position, and in this position acts as a stop to limit the advance movement of the journal 37 under the pressure of the spring 39.

A safety device is associated with the screw 36, said device taking the form in the present instance of a micro switch 44 having an actuator 45 engaging the clamping collar 41. Any outward movement of the roll 5 from the roll 3 causes a movement of the actuator 45, and the latter is adjusted so that if the outward movement of the roll 5 from the drum 3 is abnormal, the switch will be actuated. As shown in Fig. 29, this switch is connected in a circuit which includes a solenoid 46. When the switch, which is normally open, is closed by abnormal movement of the roll 5 away from the roll 3, the solenoid 46 will be energized. The solenoid is connected to a cutter blade 47, which as shown in Fig. 1 lies across the path of the web 1, said blade being normally held in a retracted position by action of a spring 48. Energization of the solenoid 46, acting through inclined slots 49, 49, and relatively fixed pins 51, causes the blade to move downwardly, and in this downward movement to coact with a relatively fixed blade 52 at the under side of the web to shear the latter. The roll 4 is provided with a similar adjusting means and safety switch 53—54, and as shown in Fig. 29, this switch also is connected in the circuit of the solenoid 46 so that when the switch is closed by excessive movement of the roll 4 away from the drum 3, the blade 47 will be actuated to sever the web as desired above.

From the roll 5 the web 1 passes around the drum 3 to a position at the top of the latter where it is started around one of the cores 6 which, as previously described, has been brought into position for this operation by the reel 8. The reel carries a uniformly spaced series of rolls 55 of special form hereinafter described, and between each pair of these rolls is mounted a core-gripping device, designated generally by the reference numeral 56, which devices receive the cores 6 from the hopper 11 and hold them immovably until the reel has turned sufficiently to bring the core into position adjoining the top of the drum 3.

The framework of the reel itself is composed of two heads, 57 and 58, which are keyed to opposite ends of the shaft 13, said heads being rigidly connected by an annular series of rectangular bars 59. Each of the heads 57 and 58 has a peripheral recess 61, and mounted within this recess and between abutments 62 is a series of members 63 which are slidable in radial direction and which constitute the supports for the core-gripping elements. These elements, one of which is shown detached in Fig. 27, comprises a tail portion 64 and a laterally offset segmental gripping portion 65. The tail portion 64 of the element, as shown in Figs. 26 and 17, is pivotally mounted in slots 66 of the members 63 upon pivot pins 67, and normally a spring 68 draws the two gripping portions 65 of each pair together in mutual core-gripping position. Sliding movement of each of the members 63 is effected through the medium of a roller 69 on the outer end thereof, which roller engages the surface of a cam 71. This cam partially embraces the end of the reel, as best shown in Fig. 2, and acts through the roller 69 during part of the rotation of the reel to maintain the members 63 in a retracted position against the pressure of a spring 72 which engages the inner end of each of the slides, as shown in Fig. 26. When the members 63 are thus retracted, the tail portions 64 of each of the coacting pairs of core-gripping elements are forced towards each other by relatively fixed rollers 73, these rollers being loosely supported on rock shafts 74 which extend between and are journaled in the heads 57 and 58.

Referring again to Fig. 2, it will be noted that the cams 71 at the respective ends of the reel extend from a point adjacent the hopper 11 around the reel in a direction counter to the direction of rotation of the latter and beyond the point where the reel most closely adjoins the drum 3. As each of the rollers 69 passes under the discharge end of the hopper 11, it is still in engagement with the cam 71, and the gripping elements 65 are, therefore, separated as illustrated. These elements are then in position to receive the opposite ends of one of the cores 6, which by suitable mechanism, such, for example, as illustrated at 75 in Fig. 2, is allowed to drop from the hopper. The roller 69 now passes out of engagement with the cam 71, the member 63 slides upwardly under action of the spring 72, and the gripping elements 65 come together on opposite sides of the core. The core is thus clamped immovably in the reel until the roller 69 again passes into engagement with the cam 71, at which time the supporting member 63 is radially retracted and the rollers 73 separate the gripping elements 65 to release the core, which then finds support throughout its length upon the drum 3 and the paper web 1 which at that point overlies the drum surface.

It is to be noted that by reason of the positions of the core-gripping devices 56 between the spaced rolls 55 and by reason of the relative positions of these rolls on the reel and with respect to the surface of the drum 3, the cores 6 when released from the clamps 65 are caged between the drum 3 on the one hand, and the contiguous pair of rolls 55 on the other hand, as shown in Figs. 2 and 26. The core is now in position to receive the web 1 for the winding operation.

In describing this phase of the machine and its operation, it will be assumed that one of the rewound rolls 7 has been carried to the point of completion, as shown, for example, in Fig. 2. The succeeding core 6 is now in position to receive the web as described above, and as also shown in Fig. 2. The operation whereby the web is transferred to the new core is effected, in a preferred embodiment of the invention, in the manner best illustrated in Figs. 2, 26, and 31 to 33, inclusive. The desired result is effected by means of compressed air operating through suitable devices in the drum 3 to elevate the web from the surface of the drum, so that the latter while still intact is caught in the nip between the core and one of the caging rolls 55.

As illustrated, the drum 3 is formed so as to provide in the interior thereof a chamber 76 for compressed air, the said air being admitted to this chamber from a suitable external source through a hollow trunnion 77, as shown in Fig. 22. The chamber 76 communicates through ports 78 with a valve chamber 79 which extends longitudinally of the drum and which is provided with a discharge port in the form of a longitudinally extending slot 81 opening to the periphery of the drum as illustrated. A valve device 82 is mounted in the chamber 79 and controls the passage of air to the slotted discharge nozzle 81. As shown in the drawings, the nozzles 81 are somewhat inclined to a radial plane of the drum in reverse direction to the rotation of the drum. Normally the outer end of the nozzle 81 will be covered by the paper web 1, and the nozzle is so located with respect to one of the perforating slots 31 that the nozzle will underlie the web on a transverse line intermediate two of the rows of perforations.

Figure 31:
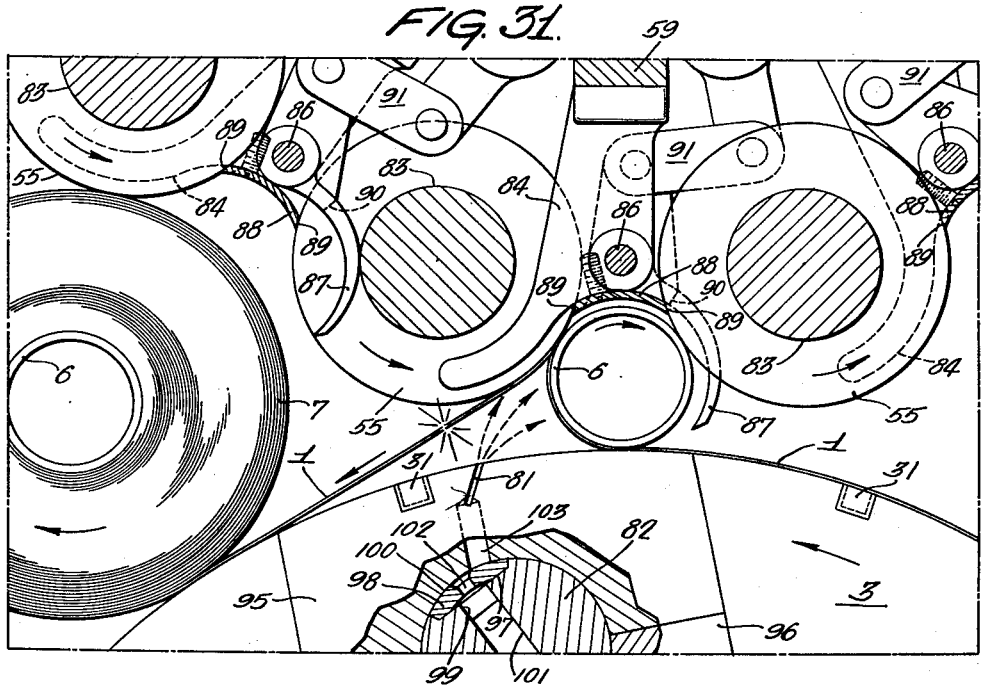
Figure 30:
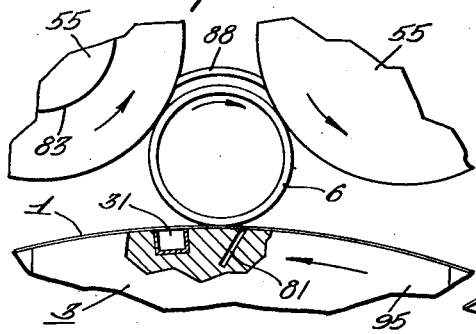
Figure 32:
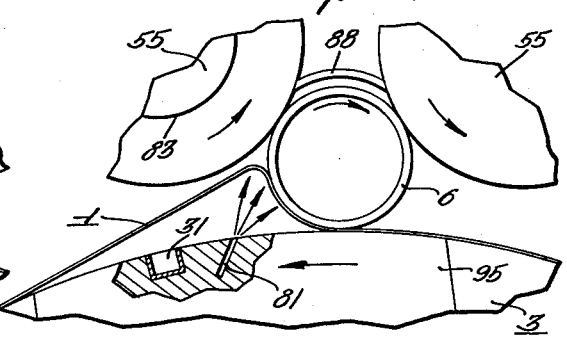
Figure 33:
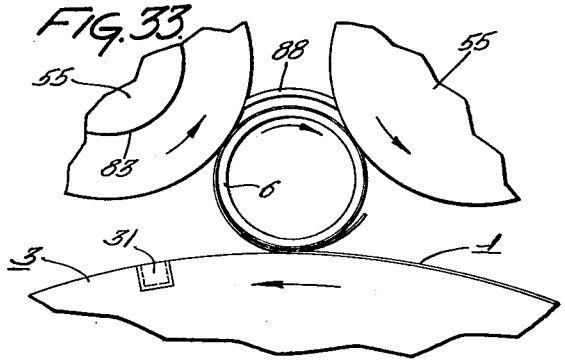

In Fig. 30, we have illustrated the various parts approximately in the position at which the transfer operation is initiated by the opening of the valve 82 to admit compressed air to the nozzle parts 81. In Fig. 26, we have illustrated an early effect of the air upon the traveling web 1, it being noted that above the slot 81, the web 1 has been elevated from the surface of the drum 3 and against the surface of the core 6 which now is confined by the contiguous pair of caging rolls 55. The core 6, when released from the reel clamps 65, is immediately set in rotation by engagement with the traveling web, and since the rolls 55 are driven at a peripheral speed slightly greater than the linear speed of the web, the core at the moment of transfer has a peripheral speed at least as great as the linear speed of the web. As the movement continues, with the air still discharging from the nozzle 81 and as shown in Fig. 32, the web is still further elevated in the form of a loop against the face of the core 6 and toward the nip between the rotating core and the leading one of the caging rolls 55. In Fig. 31, the loop in the web caused by the action of the compressed air as described above has been carried into the nip between the roll and the core, with the result, also as shown in Fig. 31, that the web is pulled apart and ruptured along one of the transverse lines of perforation between the now completed roll 7 and the new core 6. The free end of the web is now carried completely around the rotating core 6, as shown in Fig. 33, and the transfer is thereby completed with the initiation of the rewinding operation on the new core. The loop formed by the action of the air and which is forced by the latter into the nip of the core and caging roll, as described, results in part from a stretching of the web and in part by slack drawn largely from the portion of the web passing to the preceding roll. The loop is uniform throughout the width of the web, and the rupture of the web resulting from the engagement of the loop in the nip of the core and caging roll takes place accurately along one of the lines of perforations.

Means is provided on the reel for directing the air and for guiding the free end of the web around the core 6, this device being shown in Figs. 19 to 21, inclusive. As therein shown, the surfaces of the rolls 55 are, in effect, interrupted longitudinally by circumferential recesses 83. Secured to the rods 59 and extending outwardly between the respective adjoining pairs of the rolls 55 and into the recesses 83 of one of the rolls of said pair are guide shoes 84, one of these shoes being shown detached in Fig. 21. As shown in Fig. 31, these shoes 84 partially embrace that side of the new core 6 over which the web is initially passed and extend into the recesses 83 of that one of the rolls 55 which coacts with the core to nip the loop in the web caused by the compressed air, as previously described. Each of the shoes 84 is provided with a transverse opening 85 for reception of a rod 86 which extends continuously through the apertures of all of the shoes 84 of each longitudinal series. This rod 86 forms a pivot for a second set of shoes 87 which extend oppositely to the shoes 84 and into the recesses 83 of the opposite caging roll 55. One of the shoes 87 is provided for each of the said recesses 83. These shoes 87 more closely embrace the side of the core 6, as shown in Fig. 31, so as to effectively direct the free end of the web as it passes around the core into the nip between the core and underlying drum 3. Secured to the under sides of the shoes 84 and bridging the juncture between the shoes 84 and 87 is a curved plate 88, this plate extending continuously throughout the entire longitudinal series of shoes 84 and 87 and throughout the length of the associated rolls 55. As best shown in Fig. 31, the longitudinal edges of these plates 88 are in contact with the surfaces of the two opposed rolls 55, 55, and the said longitudinal edges are beveled, as indicated at 89, so as to permit them to function after the manner of a doctor blade and with respect to the surfaces of the rolls 55, 55 to preclude possibility of any portion of the web adhering to the surfaces of the rolls and to insure a proper direction of the free end of the web around the surface of the core 6. The relation of the various parts described above is well shown in Fig. 31.

The shoes 84 fit neatly between the sides of the respective recesses 83 so that they form with the intervening portions of the roll 55 what in effect is a substantially solid baffle extending from the outer extremities of the shoes to the proximate longitudinal edge of the bridge plate 88. This plate forms a continuation of the baffle between the cooperating cage rolls. The shoes 87, unlike the shoes 84, are formed with openings 90 so that in this case the effect of the solid baffle is lost. Thus, while the solid baffle at the one side and at the top of the core 6 directs the stream of air, and also guides the web, into the bite of the near roll and the core and over the top of the latter, the shoes 87 permit the air to escape freely at the other side of the core and function primarily as guides to direct the free end of the web into the bite of the core with the drum. This release of the air above the ends of the shoes 87 is necessary in order to maintain a free and unobstructed flow of air upwardly and over the core from the other side and to prevent the air by reaction with the drum from interfering with the smooth passage of the free end of the web between the core and the drum.

Since the winding operation takes place during the continued rotary movement of the reel and while the roll is caged between the rolls 55 of the reel and the drum 3, it is necessary to provide means for retracting the guide shoes 87 so as to avoid contact between the outer ends of the shoes and the growing roll. This retraction of the shoes 87 is effected through the medium of the rock shafts 74 to which the shoes 87 of each longitudinal series are operatively connected by links 91. As shown in Fig. 15, the end of each of the rock shafts 74 is provided with an arm 92, and on the arm with a roller 93 which operatively engages a relatively fixed cam 94. As the reel rotates, this cam operates through the arm 92 to rock the shaft 74 and to thereby advance and retract the guide shoe 87, the advanced position being occupied by the shoe during the transfer period.

The valve device which controls the air port 81 is best illustrated in Figs. 22 to 26, inclusive. The device comprises two housing members 95 and 96 which are set into the drum 3 as illustrated, the outer longitudinal face of the member 95 forming a part of the cylindrical face of the drum. The cylindrical valve member 82 seats accurately within a semi-cylindrical socket which extends longitudinally of the inner face of the housing member 95. Loosely seated in a longitudinal recess 97 of the member 82 is a series of segmental valve elements 98, one of these elements being shown detached in Fig. 25. These elements 98 which extend in unbroken series longitudinally of the member 82 overlie a longitudinal slot 99, and from the bottom of this slot a plurality of ports 101 extend to the opposite side of the member 82. Each of the elements 98 has a longitudinal series of apertures 102, and the outer ends of these apertures are arranged to coincide with the inner ends of a corresponding number of ports 103 which extend from the aforesaid semi-cylindrical seat in the member 95 to the inner end of the slot 81.

When the member 82 is in the position shown in Fig. 26, air passes freely from the chamber 76 through the ports 78, the chamber 79, the ports 101, and the ports 102 to the apertures 103, and thence to and through the slot 81. It will be noted that the apertures 103 are closely set so that the flow of air to and through the slot 81 will be substantially uniform from end to end. When the member 82 is shifted, as hereinafter described, to the position shown in Fig. 24, the inner ends of the apertures 103 will be covered by the side portions of the series of segmental valve elements 98. Since these elements are loose in the member 82, the compressed air will act to force them tightly against the cylindrical seat 100, with the result that the inner ends of the ports 103 will be sealed. It is to be noted that the elements 98 are carefully formed so that their surfaces conform accurately to the curved surface of the seat 100, and it will be noted further that the junctures between the ends of the adjoining elements 98 lie in each case intermediate two of the openings 103. The angular arrangement of the slot 81, which was previously mentioned and which is clearly shown in the drawings, has the effect of aiding in the operation of forcing the web upwardly around the new core in the transfer operation, as well illustrated in Fig. 26, and since the slot 81 is also angularly disposed with respect to the longitudinal axes of the ports 103, the air projected through the latter into the slot and striking the inclined side of the latter has a tendency to spread transversely and to thereby more uniformly distribute itself throughout the slot.

The member 82 is journaled in bearings 104 in the ends of the housing members 95 and 96, as illustrated in Fig. 23, and the joint between the journaled portions of the member 82 is sealed by means of packing glands 105 which are flanged, as shown in Figs. 4a and 8, and are secured to the ends of the housing sections 95 and 96 by means of screws 106. The mid portion of the valve member 82 is supported by a block 107, as shown in Fig. 23.

The manner in which the member 82 is actuated to open and close the air discharge ports is illustrated in Figs. 5 to 8, inclusive, and Fig. 4a. To each end of the member 82 is secured an arm 108, and the outer end of each of these arms is connected by a rod 109 to a link 111, which link is pivotally connected at 112 to the end of the drum 3. The rod 109 passes through an aperture 113 in the end portion 114 of the drum 3. One end of this aperture 113 is countersunk, as shown in dotted lines in Fig. 2, for reception of a spring 115 which embraces the rod 109 and which exerts resilient pressure tending to hold the parts in a position in which the valve is closed, as illustrated in Fig. 24. At the outer end of the link 111 is a roller 116 which is adapted for engagement with a cam element 117 pivotally supported at 118 in the fixed structure of the machine. When this cam element 117 is depressed, as shown in full lines in Fig. 5, it is inoperative with respect to the roller 116, but when elevated, as shown in broken lines, it lies in the path of the roller 116, and when engaged by the latter will act to shift the rod 109 longitudinally and thereby oscillate the member 82 to bring the valve to the open position, see Fig. 2. A rock shaft 119 extends transversely of the machine and has at each end an arm 121 positioned for engagement with the under side of the cam 117. It will be understood that insofar as described, the actuating means for the member 82 is duplicated at opposite sides of the machine and for opposite ends of the said member.

The rock shaft 119 is actuated through the medium of a pair of cams 122 and 123. The peripheral edges of these cams form a common support for a lever arm 124 which is pivotally secured at 125 to the fixed structure of the machine and which has attached to its outer end a link 126 which connects the said lever to an arm 127 on the shaft 119. A spring 128 normally exerts force tending to hold the link 126 in a depressed position wherein a pair of cam rollers 129 and 131 carried by the lever 124 are engaged with the peripheral surfaces of the respective cams 122 and 123. The cam 122 has a peripheral recess 132, and a corresponding recess 133 is provided in the cam 123. The rollers 129 and 131 are mounted on a common axis, and when, therefore, and only when, the two recesses 132 and 133 are in axial alignment, the rollers 129 and 131 will be permitted to move downwardly into the said recesses to thereby depress the outer end of the lever 24, and to rock the shaft 119 in a direction causing the arms 121 to elevate the cams 117.

The cam 123 is secured to a shaft 134, and this shaft is driven from a shaft 135 through the medium of a worm 136 on the latter and a worm wheel 137 on the shaft 134. The shaft 134 carries a gear 138 which meshes with a gear 139 on a stub shaft 141, this shaft also having secured thereto a second gear 142. This latter gear meshes with a gear 143 which is journaled on the shaft 134 for movement with respect to the latter, and the cam 122 is secured to the gear 143 by means of screws 144, see Fig. 7. It will be apparent that through this transmission device the cams 122 and 123 will be driven at different speeds, and one at a considerably faster rate than the other. This device affords a relatively rapid actuation of the parts and a desirable quick opening and closing of the valve.

The drum 3 is continuously rotated from a drive shaft 145, (which is connected to a suitable source of power, not shown), through the medium of gears 146, 147 and 148, the latter meshing with the gear 32 on the drum trunnion 33. The reel 8, on the other hand, has an intermittent rotation and is held stationary and locked in position during the transfer operations described above. The reel is actuated through a reciprocatory rack 149 slidably supported in the fixed framework of the machine and a pinion 151 on the reel shaft 18, see Figs. 9 to 14, inclusive. Reciprocation of the rack 149 is effected through a cam 152 which engages a roller 153 on an offset extension 154 of the rack. As illustrated in Figs. 12 and 14, the cam 152 is carried on a stub shaft 155, the outer end of which is journaled in a bracket 156 secured to the main frame 157 of the machine. The inner end of the shaft is provided with a bevel gear 158 which is connected to the power source, as hereinafter set forth. The extension 154 of the rack 149 has attached thereto a spring 159, and the other end of this spring is attached at 161 to the upper cross member 162 of the bracket 156. This spring exerts a continuous force tending to move the rack upwardly, as viewed in Fig. 12, and thereby maintains the roller 153 in engagement with the periphery of the actuating cam 152. It will be noted from Figs. 12 and 14 that the lower portion of the rack extension 154 is provided with a slotted opening 163 which embraces the shaft 155 and thus helps to support and guide the extension 154 in its longitudinal reciprocatory movement.

The toothed pinion 151 which engages the rack 149 is loosely mounted upon a sleeve 164, which sleeve is keyed to the shaft 18, all as shown in Fig. 10. The sleeve 164 has at its inner end a flange 165, the peripheral surface of which is provided with a plurality of radially extending recesses 166 arranged in uniformly spaced series around the said periphery. The outer axial face of the flange 165 is provided with an annular series of projecting lugs 167, and the adjoining face of the pinion 151 has a corresponding series of lugs 168 which are adapted to mesh with the lugs 167 to thereby interlock the pinion 151 with the sleeve 164, and through the sleeve with the shaft 18. The lugs 167 and 168 constitute in effect the interengaging elements of a dog clutch by means of which the sleeve and pinion may be operatively connected. When the pinion 151 is shifted from the position in which it is shown in Fig. 10, the elements 167 and 168 will become disengaged, thereby freeing the pinion 151 from the shaft 18 and permitting its free rotation on the outer end of the sleeve 164 as a journal.

Means is provided for engaging and disengaging the pinion 151 with and from the sleeve 164. This means comprises a bifurcated lever 169 carrying shoes 171 which engage respectively in opposite sides of a circumferential recess 172 in the pinion 151. The lever 169 is pivotally connected at 173 to the fixed structure of the machine and has a transversely extending arm 174 to which is connected a spring 175, this spring exerting continuous force tending to shift the lever on its pivot 173 in a direction to move the pinion 151 to the outer end of the sleeve 164, in which position, as set forth above, it is disengaged from the clutch elements 167 of the sleeve. The lever 169 extends below the pivot 173, and at its lower end carries a cam roller 176 which engages the face of a cam element 177. This element is slidably supported in the frame of the machine and is connected through a rod 178 with a bell crank lever 179, said lever being pivotally supported at 181 on the cross piece 162 of the bracket 156. The other end of the bell crank lever 179 carries a roller 182 which engages a cam 183 secured to the shaft 155, the contour of this cam being shown in broken lines in Fig. 12. A spring 184 on the rod 178 tends to retain the rod in an elevated position, and to maintain the roller 182 in engagement with the cam 183. Elevation of the cam 177 by action of the cam 183 has the effect of shifting the pinion 151 to the left, as viewed in Figs. 9 and 10, against the action of the spring 175, and to thereby engage the clutch elements 168 of the pinion with the corresponding elements 167 on the sleeve 164. When the cam 177 is moved to its alternate low position, the spring 175 operates to disengage the clutch elements.

In these movements of the pinion 151, the teeth thereof remain continuously in mesh with the teeth of the rack 149. The cams 152 and 183 are so related that while the former is operating to move the rack 149 downwardly, the pinion 151 is interlocked with the sleeve 164, and therethrough with the shaft 18 whereby the reel 8 is rotated in the required direction. At the lower end of the downward movement of the rack 149, the cam 183 operates to disengage the pinion 151 from the sleeve 165 and the shaft 18, and the pinion 151 is thereby free to rotate on the sleeve without affecting the position of the reel 8 during the upward stroke of the rack. At the upper end of the rack movement, the cam 183 again acts to engage the pinion with the shaft 18, so that the subsequent downward movement of the rack causes a further rotational movement of the reel.

Means is also provided for positively locking the reel in place during the periods in which the rack is inoperative with respect thereto. Slidably mounted in the frame is a latch member 185, and this latch is adapted to engage in one or other of the recesses 166 in the periphery of the sleeve 164 to thereby lock the sleeve and with it the reel shaft 18 in fixed position. This function of the latch 185 is illustrated in Fig. 10. A spring 186 tends to force the latch into the elevated or operative position. A lever 187 is pivotally secured in the frame by a pin 188, and the inner end of this lever is slotted for reception of a pin 189 on the latch element 185. Pivotally connected by means of a pin 191 to the outer end of the lever 187 is a block 192 which seats upon a projecting arm 193 of the cam element 177. When this cam element is depressed, therefore, as previously described, so as to permit the spring 175 to release the pinion 151 from its clutching engagement with the sleeve 164, the outer end of the lever 187 is permitted to move downwardly so that the spring 186 is operative to elevate the latch element 185 into one of the recesses 166 in the sleeve 164, as shown in Fig. 10. Elevation of the cam element 177 to reengage the pinion 151 with the sleeve 164 causes an elevation of the outer end of the lever 187 and a consequent downward retraction of the latch 185 from the recess 166 in the sleeve. It will be noted that the recesses 166 of the sleeve 165 and the latch 185 are arranged so that when the reel is locked in position by operation of this device, one or other of the core-retaining elements of the reel will be in proper position with respect to the drum 3 for the transfer of the web to a new core, as described above.

As previously set forth, the caging rolls 55 of the reel are driven so that their peripheral speeds are slightly greater than the peripheral speed of the drum 3. As shown in Figs. 17 and 18, each of the rolls 55 is journaled at 194 in the head members 57 of the reel, and each of the rolls has at its extremity a pinion 195. All of the pinions 195 mesh with one element 196 of a composite gear 190 which is journaled freely on the shaft 18. The other element 197 of this composite gear meshes with a pinion 198 at one end of a stub shaft 199 journaled in the fixed frame of the machine, and the other end of this shaft carries a pinion 201 which is connected through an idler gear 202 with the gear 32 of the drum 3. The rolls 55 are thus driven from the same source of power which operates the drum 3.

The shaft 155 which carries the cams 152 and 183 previously described receives its motion from a shaft 203. A bevel pinion 204 on this shaft meshes with the bevel gear 158 on the shaft 155. The shaft 203 is driven in turn from the drum 3 through the medium of a gear train best shown in Figs. 9 and 12. The drum trunnion 33 has loosely mounted thereon a gear 205, and this gear is normally locked with the shaft by means of a latching device shown in Figs. 13 and 28. This device comprises a latch 206 which is slidably supported in a sleeve 207 secured to the end of the shaft 33 and on which the gear 205 is journaled, said latch passing into an apertured lug 208 on the gear 205. A spring 209 tends to hold the latch in the advanced or operative position, as shown in Fig. 13, and the latch may be retracted through a handle element 211 to release the gear 205 from the shaft.

The gear 205 is sufficiently broad of face to engage two gears 212 and 213, which are of different pitch diameters and are journaled upon relatively eccentric journals 214 and 215 on a common stub shaft secured to the fixed framework of the machine, see Fig. 28. The gears 212 and 213 are adapted to mesh respectively with separate gear elements 216 and 217 of a composite gear 218 which is splined to a shaft 219 journaled in the casing, as shown in Fig. 9. The arrangement is such that when as shown in Fig. 28 the gear element 217 is in mesh with its companion gear 213, the gear 216 is out of mesh with the gear 212; and by sliding the composite gear 218 to the right, as viewed in Fig. 9, the gear 216 is brought into mesh with the gear 212 simultaneously with the disengagement of the gear 217 from the gear 213. The composite gear 218 may be shifted by means of a lever 221. This lever is pivotally mounted at 222 in the casing and has an arm 223 which carries a shoe 224 projecting into the circumferential groove 225 in the composite gear 218. Oscillation of the lever 221 thus shifts the composite gear as required. A retractible pin 226 in the outer end of the lever 221 is adapted to engage in apertures 227 in the frame to hold the lever in either of the positions of adjustment. The shaft 219 carries a worm 228 which meshes with a worm wheel 229 on the shaft 203. The aforedescribed transmission provides for operation of the cams 152 and 183 at different rates of speed, depending on the adjustment of the composite gear 218. This adjustment is one of two required for regulating the amount or length of paper to be wound onto the cores 6, as hereinafter explained. It is apparent that by utilizing other combinations of gears in the train described above, the length of paper wound on the cores for each roll may be changed within wide limits.

It will be apparent that to shift the gears 216 and 217 in order to change the ratio described above, it will be necessary to bring these gears into a position where the teeth of the unmeshed gears will be in the relative position to permit the shift. This may be accomplished without turning the drum 3 by disengaging the latch 206 from the gear 205. Provision is made for then turning the composite gear 218 by hand so as to bring these gears into a position with respect to the companion gears 212 and 213 where the shift may be made. This means comprises a gear 231, which is journaled in a stub shaft 232 on the casing and which meshes with the gear 216, the face of the gear 231 being sufficiently wide to maintain a constant mesh with the said gear 216 irrespective of the axial adjustment of the composite gear of which the latter forms an element. The gear 231 is provided with a central projecting rectangular hub 233 for reception of a wrench for turning the gear by hand.

The machine, as stated, embodies means for varying the amount or length of paper to be wound upon the cores 6. To this end, a variable transmission is applied between the drive shaft 145 and the shaft 135 which actuates the air valve 82. With reference to Figs. 1 and 4a, it will be noted that the shaft 135 has a bevel gear 234 at its lower end which meshes with a gear 235 on a shaft 236 suitably journaled in the frame of the machine. The shaft 236 has splined to its outer end a composite gear having two gear elements 237 and 238. The gear element 238 is adapted to mesh with a broad faced idler gear 239, and the smaller gear 237 with a second idler 241, both of these idler gears meshing with a gear 242 on a stub shaft 243. The shaft 243 also carries a gear 244 which meshes with the gear 147 in the gear train which connects the drive shaft 145 with the drum gear 32. The composite gear is arranged so that when the gear element 238 meshes with the gear 239, as shown in Fig. 4a, the gear 237 is out of mesh with the gear 241; and when the composite gear is shifted to the left, as viewed in Fig. 4a, the gear 238 will be disengaged from the gear 239, while the gear 237 is brought into mesh with the gear 241. This change provides for operation of the air valve of the transfer device previously described at different intervals of time with respect to the travel of the paper web on the drum 3.

Shifting of the composite gear 237—238 between the alternative positions described above may be effected through the medium of a pivoted lever 245 which carries a shoe 246 for engagement with a circumferential recess in the composite gear. It will be apparent that when changing the intervals in the operation of the transfer valve as described above, the speed of movement of the reel 8 will have to be modified also in order to preserve the timed relation between the movements of the cores and the actuation of the transfer valve. This adjustment of the speed of the reel is effected by the means described above which regulates the rate of movement of the cams 152 and 183.

Figure 4:
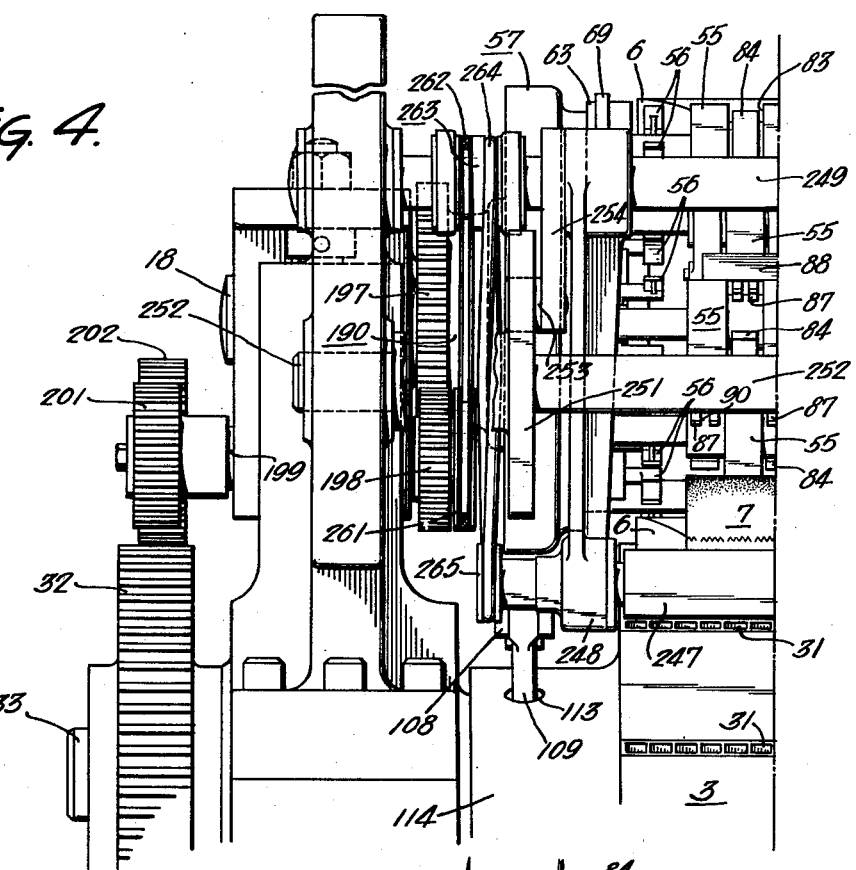

After each transfer operation in which the web is started on a new core, the reel, which during the actual transfer operation has been stationary, will continue its interrupted movement, so that as the diameter of the new roll builds up, the space required for the increasing diameter will be provided between the caging rolls 55 and the drum 3. During the initial part of this winding operation, the roll is confined between the drum and the caging rolls 55, but as the movement of the reel continues, it is necessary, in order to maintain the roll in engagement with the drum and to maintain also the pressure upon the roll which determines the density of the latter, to bring into operation an independent caging roll 247. This roll is supported on the end of arms 248 pivotally mounted one at each side of the machine upon a rock shaft 249 suitably journaled in the fixed frame of the machine, as shown in Figs. 4 and 9. Oscillation of the shaft 249 is effected by cams 251, 251 mounted at each end of a shaft 252 journaled in the frame of the machine, each of said cams operatively engaging a roller 253 on an arm 254 secured to the shaft 249. The shaft 252 is driven from the shaft 203 through an intermediate shaft 255, this intermediate shaft being connected to the shaft 203 through the medium of bevel gears 256 and 257, and to the shaft 252 by a bevel pinion 258 and a bevel gear 259. The cam 251 operates to move the roll 247 into engagement with the roll 7 at the proper point in the movement of this roll with the rotating reel, and subsequently to gradually retract the roll 247 so as to maintain the roll 7 under proper compression between the drum 3, one of the caging rollers 55 on the reel and the caging roll 247, all as shown in Fig. 2.

The roll 247 is driven at a speed slightly in excess of the peripheral speed of the roll by means of a belt drive from a pulley 261 at the inner end of the stub shaft 199. From this pulley a belt 262 extends to a composite pulley 263 journaled on the shaft 249, and this pulley is in turn connected through a cross belt 264 with a pulley 265 on the end of the roll 247, as best shown in Fig. 4. Since the speed of movement of the caging rolls 55 on the reel and of the caging roll 247 is predetermined and positive, it will be apparent that the roll 7 will be maintained under constant confining pressure between these rolls and the drum 3.

When the transfer operation is completed, the caging roll 247 will move away from the roll 7 to an extent permitting the roll to fall by gravity onto a chute 266 by which it will be conducted to a suitable conveyor or point of disposal. In the event that the transfer devices fail to function properly, with the result that the web is not ruptured, the slack web will be carried in a free loop downwardly on the drum 3 into the nip of a pinch roll 267, and the resulting quick jerk on the web will be sufficient to part it from the finished roll 7. The free end of the paper thus moving around the drum 3 will be guided from the surface of the drum by a doctor blade 268, and will pass downwardly into a broke bin 269. A jet of compressed air from a duct 271 in the upper end of the bin insures a continuing flow of the paper into the bin until the operation of the machine has been interrupted and a proper transfer of the web made on a new core.

The operation of the machine will be understood from the foregoing description. It will be noted particularly that all of the essential operations upon the paper web, including the perforating, the transfer, and the winding operations, are carried out against the surface of the drum 3. The moving web is thus maintained continuously under close control, a factor which contributes in substantial degree to the high speed characteristics of the machine and the ability to transfer without deceleration. The positive confinement of the paper roll during winding between the drum and the caging rolls provides for accurate control of the diameter of the finished roll, it being possible by this means to produce rolls varying widely as to paper content with little or no variation in diameter, but with densities differing in accordance with said content. The relative speeds of the drum 3 and of the linear movements of the caging rolls in their respective paths during the winding operation is a determining factor in the diameter of the finished roll. A given synchronization in the movements of the drum and the reel, and in the periodic operations of the air valve, will produce a wound roll of predetermined diameter and paper content. The paper content of the roll may then be reduced without reduction in the diameter by shortening the interval between valve operations and by correspondingly increasing the speed of the reel.

When the machine is used for winding toilet tissue, it is desirable that the drum 3 be constructed so that the desired total number of sheets in the finished roll, as defined by the lines of perforations, shall be some multiple of the number of perforating slots 31 in the drum. In this way the timing of the valve actuations may be related to a number of full revolutions of the drum.

The device whereby the paper web is transferred to the newly presented cores is of particular importance, and contributes materially to the ability of the machine to operate at high speeds and with the web traveling continuously at a constant high rate of speed, in excess, for example, of one thousand feet per minute. For transfer operations at this speed and with paper of the toilet tissue type, we prefer to use a short blast of medium pressure air, say in the neighborhood of forty-five pounds. A small volume of air is desirable for rapid dissipation after transfer is completed. It is to be noted that in the illustrated embodiment, the initial opening of the valve occurs when the nozzle is about two degrees of drum movement in advance of the point where the core contacts the web when the core is in the transfer position, and that the valve remains open through an angular drum movement of approximately thirteen degrees. This timing of the valve and the air pressure may vary with the type of paper being processed and the speed of web movement.

One advantage of this mode of transfer is that it provides for actually starting the web on the core before the continuity of the web from the master roll to the preceding wound roll is interrupted, the actual rupture of the web resulting from the engagement of the web with the new core instead of by extraneous means independent of the initiation of the new winding operation. The distinction is clearly brought out in Fig. 34, wherein we have illustrated a modification of the transfer device. In this case, the timing of the air valve and the pressure of the air are adjusted to afford a rupture of the web by the force of the air blast, the free end of the incoming web being then directed upwardly into the nip between the core and the proximate caging roll 55, and being guided by the means previously described and by the action of the air around the core. While this transfer operation is entirely practical, the rupture of the web prior to the actual starting of the web on the new core introduces a possible source of failure which in large part is eliminated by the operation previously described. It is to be noted also that the transfer device provides for a starting of the web upon the cores without the use of water or adhesive.

The initial rotation of the cores occurs after they have been released from the reel into engagement with the traveling web on the drum, and results from said engagement. The conventional tubular cardboard core for toilet rolls is light in weight and quickly takes the speed of the traveling web. During the transfer and winding operations the roll is driven continuously and solely by peripheral engagement with the drum and the caging rolls, said engagement extending over the entire length of the roll. This method of roll actuation not only affords a superior control of the winding operation, but substantially eliminates the tendency of the core to vibrate at the higher rotative speeds and insures a smooth and efficient initiation of the winding operation. Also, since the peripheral speed of the roll must conform at all times to the speed of the web, no compensation is required for the changing diameter of the roll.

We claim:

1. In apparatus for winding individual rolls from a web, a drum about which a continuously traveling web is fed, means for periodically delivering a core against the drum, caging means confining the core against the drum, means for parting the traveling web from a previously wound roll and for instituting winding of the web upon the core, and means providing for controllable separation of the caging means and drum to regulate build-up of the roll on the core.

2. In apparatus for winding individual rolls from a web, a drum about which the web is fed, means for periodically delivering a core against the drum, caging rolls confining the core against the drum, means for parting the web from a previously wound roll and for instituting winding of the web upon the core, and means for controllably separating the caging rolls and drum to regulate build-up of the roll on the core.

3. In apparatus for winding individual rolls from a web, a drum about which a continuously traveling web is fed, said drum being driven at a peripheral speed corresponding substantially to the linear speed of the web, means for periodically delivering a core against the drum, caging means confining the core against the drum, means for parting the traveling web from a previously wound roll and for instituting winding of the web upon the core, and means providing for controllable separation of the caging means and drum to thereby control the diametrical dimension of the roll forming on the core.

4. In apparatus for winding individual rolls from a web, a drum about which the web is fed, means for periodically delivering a core against the drum, caging means confining the core against the drum, means for parting the web from a previously wound roll and for instituting winding of the web upon the core, the drum and said caging means being relatively movable so as to compensate for build-up of the roll on the core, and means for predeterminably regulating said relative movement so as to control the diametrical dimension of the roll.

5. In apparatus for winding individual rolls from a web, a drum about which the web is fed, means for periodically delivering a core against the drum, driven caging rolls confining the core against the drum, means for parting the web from a previously wound roll and for instituting winding of the web upon the core, and means for separating the caging rolls and drum to compensate for build-up of the roll on the core, said means being synchronized with the linear movement of the web so as to predetermine the diameter of the roll.

6. In apparatus for winding individual rolls from a web, a drum about which the web is fed continuously, means for periodically delivering a core against the drum, caging means confining the core against the drum, means for parting the continuously traveling web from a previously wound roll and for instituting winding of the web upon the core, means to separate the caging means and drum at a predetermined rate to compensate for build-up of the roll on the core and to regulate the diametrical size of the roll, and means operating in timed relation to said web-parting means for further separating the caging means and drum to an extent permitting escape of the fully wound roll.

7. In apparatus for winding individual rolls from a traveling web, a drum about which the web is fed continuously, said drum being continuously driven at a constant peripheral speed corresponding substantially to the linear speed of the web, means for periodically delivering a core against the drum, caging means confining the core against the drum, means for parting the continuously traveling web from a previously wound roll and for instituting winding of the web upon the core, means providing for separation of the caging means and drum to compensate for build-up of the roll on the core, means for restricting said separation to a predetermined rate relating to the linear travel of the web, and means operating in timed relation to said web-parting means for separating the caging means and drum to an extent permitting escape of the fully wound roll.

8. In apparatus for winding individual rolls from a web, a rotary drum about which the web is fed, means for periodically delivering a core against the drum and upon the web, caging rolls for engaging and confining the core against the drum, and means for diverting the web from the drum and into the nip of one of said caging rolls and the core to institute winding of the web upon the core and thereby to part the web from a previously wound roll.

9. In apparatus for winding individual rolls from a web, a rotary drum about which the web is fed, means for periodically delivering a core against the drum and upon said web, caging rolls for engaging and confining the core against the drum, and pneumatic means for elevating the web from the surface of the drum and into the bite between one of said rolls and the core to institute winding of the web upon the core and thereby to part the web from a previously wound roll.

10. In apparatus for winding individual rolls from a web, a rotary drum about which the web is fed, means for periodically delivering a core against the drum and upon the web, caging rolls for engaging and confining the core against the drum, and pneumatic means carried by the drum for lifting the web away from the latter and into the bite between one of said caging rolls and the core to thereby institute winding of the web upon the core and to part the web from a previously wound roll.

11. In apparatus for winding individual rolls from a web, a continuously driven drum about which the web is fed, means for periodically delivering a core against the drum, means for pressing the core upon the web and for maintaining the rolls during winding in pressure engagement with the drum, and pneumatic means on the drum operative on the web in a position between the respective rolls and the succeeding core for parting the web and instituting the winding thereof upon the core.

12. In apparatus for winding individual rolls from a web, a continuously driven drum about which the web is fed, means for periodically delivering a core against the drum, caging rolls for pressing the core upon the web and for maintaining the rolls during winding in pressure engagement with the drum, and pneumatic means on the drum operative on the web in a position between the respective wound rolls and the succeeding core to displace the web from the drum and into the nip of one of the caging rolls and the core to thereby institute winding of the web on the core with resulting parting of the web from the previously wound roll.

13. In apparatus for winding individual rolls from a web, a continuously driven drum about which the web is fed, means for periodically delivering a core against the drum, means for pressing the core upon the web and for maintaining the rolls during winding in pressure engagement with the drum, and pneumatic means on the drum operating on the web at a position between a previously wound roll and the succeeding core for parting the web from the wound roll and for directing the free end of the web around the core so as to institute winding of the web on the latter.

14. In apparatus for winding individual rolls from a web, a continuously driven drum to which the web is fed, means for periodically delivering a core against the drum, means for pressing the core upon the web and against the drum at a position spaced from a previously wound roll, pneumatic means for parting the web between the said wound roll and the core and for directing the free end of the web about the core, and means for maintaining each of the rolls thus started on the cores in pressure engagement with the drum until completion of the succeeding web-parting operation.

15. In apparatus for winding individual rolls from a web, a continuously driven drum about which the web is fed, means for periodically delivering a core against the drum and upon the web, pneumatic means on the drum for displacing the web from the surface of the latter and against one side of the core, and guide means embracing the core and directing the web around the latter.

16. In apparatus for winding individual rolls from a web, a continuously driven drum about which the web is fed, means for periodically delivering a core against the drum and upon the web, a driven roll having pressure engagement with the core, and pneumatic means for tucking the web into the nip between the said roll and the core so as to institute the winding of the web upon the core and to thereby part the web from a previously wound roll.

17. In apparatus for winding individual rolls from a web, a continuously driven drum about which the web is fed, means for periodically delivering a core against the drum and upon the web, a driven roll having pressure engagement with the core, pneumatic means for tucking the web into the nip between the said roll and the core to institute the winding of the web upon the core and to thereby part the web from a previously wound roll, and guide means for directing the free end of the web around the core.

18. In apparatus for winding individual rolls from a web, a continuously driven drum about which the web is fed, a reel for periodic delivery of cores to the drum, a plurality of core-retaining devices on the reel, means for actuating the devices to release the cores against the drum, and caging means on the reel for confining the core upon the drum preparatory to the winding operation.

19. In apparatus for winding individual rolls from a web, a continuously driven drum about which the web is fed, a reel adjoining the drum, a plurality of core-retaining devices on the reel, means for rotating the reel so as to bring the retaining devices successively into proximity to the drum, means for actuating the devices when in the said proximate position to release the core onto the drum, and means for winding the web on the cores, said means including caging rolls on the reel for confining the released cores against the drum.

20. In apparatus for winding individual rolls from a web, a drum about which the web is fed, a reel adjoining the drum, circumferentially spaced core-retaining devices on the reel, means for rotating the reel so as to bring the retaining devices successively into proximity to the drum, means for actuating the devices when in the said proximate position to release the core onto the drum, a roller at each side of each of the retaining devices, said rollers being operative in pairs to confine the released cores against the drum, means for interrupting the rotation of the reel and for then effecting transfer of the web to the core for initiation of a winding operation, and means for thereafter continuing the rotary movement of the reel so that said rollers may be controllably and progressively retracted from the drum during the winding operation.

21. In apparatus for winding individual rolls from a web, a drum about which the web is fed, a reel adjoining the drum, circumferentially spaced core-retaining devices on the reel, means for rotating the reel so as to bring the retaining devices successively into proximity to the drum, means for actuating the devices when in the said proximate position to release the core onto the drum, rollers on the reel operative in pairs to confine the released cores against the drum, means for interrupting the rotation of the reel and for then effecting transfer of the web to the core for initiation of a winding operation, means for thereafter continuing the rotary movement of the reel so that said rollers may be controllably and progressively retracted from the drum, and a caging roll separate from said reel and cooperative with the said rollers to confine the roll during the winding operation.

22. In apparatus for winding individual rolls from a web, a rotary drum about which the web is fed, means for periodically delivering a core to the drum, and means for parting the web from a previously wound roll and for winding the web upon the core, said delivery means comprising a conveyer moving in proximity to said drum, core-retaining means on the conveyer, means for actuating the retaining means to release the core upon the drum, and rotary means on the conveyer for confining the core and the roll forming thereon against the drum during the winding operation.

23. In apparatus for winding individual rolls from a web, a rotary drum about which the web is fed, means for periodically delivering a core to the drum, and means for parting the web from a previously wound roll and for winding the web upon the core, said delivery means comprising a driven reel in proximity to said drum and comprising core-retaining elements, means for actuating said elements to release the core upon the drum, and rollers positioned on the reel so as to confine the released core against the drum.

24. In apparatus for winding individual rolls from a web, a rotary drum about which the web is fed, means for periodically delivering a core to the drum, and means for parting the web from a previously wound roll and for winding the web upon the core, said delivery means comprising a driven reel in proximity to the drum and having synchronized movement with respect to the latter, and rotary means for confining the core and the roll forming thereon in pressure engagement with the drum during the winding operation, said rotary means comprising elements on the reel and an element separate from and having synchronized movement with respect to the reel.

25. In apparatus for winding individual rolls from a web, a rotary drum about which the web is fed, means for periodically delivering a core to the drum, and means for parting the web from a previously wound roll and for winding the web upon the core, said delivery means comprising a driven reel in proximity to the drum, rollers on the reel operative in pairs to confine the core against the drum, and web-guiding means associated with the rollers and partially embracing the confined core.

26. In apparatus for winding individual rolls from a web, a rotary drum about which the web is fed, means for periodically delivering a core to the drum, and means for parting the web from a previously wound roll and for winding the web upon the core, said delivery means comprising a driven reel in proximity to the drum, rollers on the reel operative in pairs to confine the core against the drum, said rollers having circumferential recesses, and web-guiding elements on the reel between the rollers and extending into said recesses so as to partially embrace the confined core.

27. In apparatus for winding individual rolls from a web, a rotary drum about which the web is fed, means for periodically delivering a core to the drum, and means for parting the web from a previously wound roll and for winding the web upon the core, said delivery means comprising a driven reel in proximity to the drum, rollers on the reel operative in pairs to confine the core against the drum, said rollers having circumferential recesses, web-guiding elements on the reel between the rollers and extending into said said recesses so as to partially embrace the confined core, the said elements at one side of the core extending into close proximity to the drum, and means for periodically retracting and again advancing the last-named elements.

28. In apparatus for winding individual rolls from a web, a rotary drum about which the web is fed, means for periodically delivering a core to the drum, and means for parting the web from a previously wound roll and for winding the web upon the core, said delivery means comprising a driven reel in proximity to the drum, rollers on the reel operative in pairs to confine the core against the drum, core-clamping means on the reel associated with each of said pairs of rollers for supporting a core therebetween, and means operating in synchronism with movements of the reel to periodically open and close said clamps.

29. In apparatus for winding individual rolls from a web, a rotary drum about which the web is fed, means for periodically delivering a core to the drum, and means for parting the web from a previously wound roll and for winding the web upon the core, said delivery means comprising a driven reel in proximity to the drum, rollers on the reel operative in pairs to forcibly confine the core for rotation against the drum and upon the web, pneumatic means on the drum for starting the web on the core and between the core and the rollers, and guide means operatively associated with the rollers and partially embracing the confined core for guiding the web around the latter and into the nip between the core and the drum.

30. In apparatus for winding individual rolls from a web, the combination with a rotary drum about which the web is fed, of means for periodically delivering a core against the drum and upon the web, means operative after said delivery and while the core is in pressure engagement with the web on the drum for parting the web from a previously wound roll and for instituting winding of the web upon the core, and means for controlling the distance between the cylindrical axis of the roll thus started and the drum during the winding operation to thereby regulate the diameter of the finished roll.

31. In apparatus for winding individual rolls from a web, the combination with a drum and means for rotating said drum continuously at a constant angular velocity, of means for periodically delivering a core against the drum and upon the web, means for parting the web from a previously wound roll and for instituting winding of the web upon the core, means for actuating said parting means after a predetermined number of revolutions of the drum, said actuating means being adjustable to vary the ratio of actuations to revolutions, means engaging the roll and retractibly movable with respect to the drum for regulating the diametrical size of the roll, and means for variably synchronizing the retractive movement of said regulating means with the rotation of the drum.

32. In apparatus for winding individual rolls from a web, which said apparatus comprises a rotary drum about which the web is fed, means for periodically delivering a core to the drum, and means for parting the web from a previously wound roll and for winding the web upon the core; said parting means including a chamber in said drum, means for connecting the chamber with a source of compressed air, an axially extending discharge port for the chamber in the periphery of the drum, valve means in the chamber controlling the port, and mechanism for actuating the valve to periodically uncover the port.

33. In apparatus for winding individual rolls from a web, which said apparatus comprises a rotary drum about which the web is fed, means for periodically delivering a core to the drum, and means for parting the web from a previously wound roll and for winding the web upon the core; said parting means including a chamber in said drum, a discharge port for the chamber extending to the periphery of the drum, a valve seat in the chamber embracing the inner end of said port, a valve member movably engaging said seat and having a recess in its seating face and a passage terminating in said recess and communicating with the chamber, means for connecting the chamber with a source of compressed air, and a valve element loosely mounted in said recess and fitted to the valve seat, said element having an opening communicating with said passage and arranged for registration with said port when the valve member is in a given position, and the inner face of said element being exposed through said passage to the air pressure in the chamber whereby in another position of the valve member the element is forced by said pressure against the valve seat in sealing relation to the port.

34. In apparatus for winding individual rolls from a web, which said apparatus comprises a rotary drum about which the web is fed, means for periodically delivering a core to the drum, and means for parting the web from a previously wound roll and for winding the web upon the core; said parting means including a chamber in said drum, an axially extending port in the periphery of the drum communicating with the chamber, a valve in the drum to control the port, means for operating the valve in synchronism with the rotary movement of the drum to periodically open and close the port, and means for connecting the said chamber with a source of pressure air.

35. In apparatus for winding individual rolls from a web, a rotary drum about which the web is fed, means for periodically delivering a core to the drum, means for holding the core upon the web and against the drum, and means for parting the web from a previously wound roll and for instituting winding of the web upon the core, said means comprising a source of compressed air associated with the drum, means for releasing the air against the web adjacent one side of the core, and means extending over the core to the other side thereof and forming a guide channel both for the air and the web by way of which the said web is carried over the core and inwardly into the bite between the core and the drum.

36. In apparatus for winding individual rolls from a web, a rotary drum about which the web is fed, means for periodically delivering a core to the drum, means for holding the core upon the web and against the drum, and means for parting the web from a previously wound roll and for instituting winding of the web upon the core, said means comprising a source of compressed air associated with the drum, means for releasing the air against the web adjacent one side of the core, means extending over the core to the other side thereof and forming a guide channel both for the air and the web by way of which the said web is carried over the core and inwarly into the bite between the core and the drum, said channel-forming means having openings at the said other side of the core affording ports for release of the air in advance of the terminal end of the channel.

37. In apparatus for winding individual rolls from a web, a rotary drum about which the web is fed, means for periodically delivering a core to the drum, circumferentially recessed caging rollers for holding the core upon the web and against the drum, and means for parting the web from a previously wound roll and for instituting winding of the web upon the core, said means comprising a source of compressed air associated with the drum, means for releasing the air against the web adjacent one side of the core and toward the said circumferential recesses of the proximate caging roller, means associated with said recesses for guiding the air and the web outwardly and over the roll, and guide means associated with the said recesses of the other roller for guiding the web inwardly at that side of the core and into the bite between the core and the drum, said guide means being apertured so as to release the air into and through the said roller recesses and away from said bite.

38. In apparatus for winding individual rolls from a web, which said apparatus comprises a rotary drum about which the web is fed, means for periodically delivering a core to the drum, and means for parting the web from a previously wound roll and for winding the web upon the core; said parting means including a chamber in said drum, means for connecting the chamber with a source of compressed air, an axially extending discharge port for the chamber in the periphery of the drum, valve means in the chamber controlling the part, an operating element for said valve, a pair of rotary cams engaging said element and adapted in a single position of relative angular adjustment to actuate the latter, and means for rotating the cams in synchronism with the drum but at different rates of speed so as to actuate the valve periodically to uncover the port.

39. In apparatus for winding individual rolls from a web, which said apparatus comprises a rotary drum about which the web is fed, means for periodically delivering a core to the drum, and means for parting the web from a previously wound roll and for winding the web upon the core; said parting means including a chamber in said drum, means for connecting the chamber with a source of compressed air, an axially extending disharge port for the chamber in the periphery of the drum, valve means in the chamber controlling the port, an operating element for said valve, a pair of rotary cams forming a common support for and each having a recess for reception of the element, said recesses when mutually aligned with said element permittnig a shifting of the latter resulting in actuation of the valve to uncover the port, and means for rotating the cams in synchronism with the drum but at different rates of speed so as to periodically actuate the valve.

40. In apparatus for winding individual rolls from a web, which said apparatus comprises a rotary drum about which the web is fed, means for periodically delivering a core to the drum, and means for parting the web from a previously wound roll and for winding the web upon the core; a roll resiliently held against the web upon the drum, a micromatic switch operative by displacement of the roll from the drum, and electrically-actuated safety means controlled by said switch.

41. In apparatus for winding individual rolls from a web, which said apparatus comprises a rotary drum about which the web is fed, means for periodically delivering a core to the drum, and means for parting the web from a previously wound roll and for winding the web upon the core; a roll resiliently held against the web upon the drum, a micromatic switch operative by displacement of the roll from the drum, and electrically-actuated web-severing means in advance of the drum controlled by said switch.

42. In apparatus for winding individual rolls from a web, which said apparatus comprises a rotary drum about which the web is fed, means for periodically delivering a core to the drum, and means for transferring the web from a previously wound roll to the core; a roller engaging the drum at a point removed from the said transfer position in the direction of drum rotation, and means following the roller for diverting the web from the drum in the event of failure of the said transfer operation.

WESLEY S. CORBIN.
FRANCIS CHILSON.
PAUL L. TOLLISON.
CHAS. S. CAFFREY.
ALFRED F. PILON.